(12) United States Patent
Guan et al.

(10) Patent No.: US 11,496,204 B2
(45) Date of Patent: Nov. 8, 2022

(54) BEAM TRAINING METHOD, APPARATUS, AND SYSTEM

(71) Applicant: HUAWEI TECHNOLOGIES CO., LTD., Guangdong (CN)

(72) Inventors: Peng Guan, Shenzhen (CN); Xiaoyong Tang, Shenzhen (CN); Xiaona Wang, Chengdu (CN); Xi Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/095,017

(22) Filed: Nov. 11, 2020

(65) Prior Publication Data

US 2021/0067233 A1    Mar. 4, 2021

Related U.S. Application Data

(63) Continuation of application No. PCT/CN2019/086447, filed on May 10, 2019.

(30) Foreign Application Priority Data

May 11, 2018   (CN) .......................... 201810451328.3

(51) Int. Cl.
*H04B 7/08*      (2006.01)
*H04B 7/06*      (2006.01)
*H04B 7/0413*    (2017.01)

(52) U.S. Cl.
CPC .......... *H04B 7/088* (2013.01); *H04B 7/0695* (2013.01); *H04B 7/0413* (2013.01)

(58) Field of Classification Search
CPC .... H04B 7/0695; H04B 7/0639; H04B 17/24; H04B 7/088; H04B 7/0413
See application file for complete search history.

(56) References Cited

U.S. PATENT DOCUMENTS

2016/0087695 A1    3/2016  Wang
2018/0331747 A1*  11/2018  Kakishima ........... H04B 7/0626
2019/0173547 A1*   6/2019  Li ..................... H04B 7/0617

FOREIGN PATENT DOCUMENTS

| CN | 103220802 A | 7/2013 |
| CN | 106817157 A | 6/2017 |
| CN | 107836124 A | 3/2018 |

(Continued)

OTHER PUBLICATIONS

Office Action issued in Indian Application No. 202047050412 dated Jul. 9, 2021, 8 pages.

(Continued)

*Primary Examiner* — Sophia Vlahos
(74) *Attorney, Agent, or Firm* — Fish & Richardson P.C.

(57) ABSTRACT

Embodiments of this application disclose beam training methods, apparatuses, and systems. One method includes: receiving, from a network device, interference-related information; receiving, from the network device, a downlink signal sent through two or more beams, wherein the two or more beams comprise an interfering beam that causes interference to a terminal device; and transmitting, to the network device, information related to a beam selected from the two or more beams, wherein the beam is selected by the terminal device based on the interference-related information and a measurement result obtained from measuring the downlink signal.

26 Claims, 5 Drawing Sheets

(56) References Cited

FOREIGN PATENT DOCUMENTS

| RU | 2621678 C2 | 6/2017 | | |
|---|---|---|---|---|
| WO | 2017180334 A1 | 10/2017 | | |
| WO | WO-2018128940 A2 | * | 7/2018 | ......... H04L 25/0224 |

OTHER PUBLICATIONS

Ericsson, "On beam indication, measurement, and reporting," 3GPP TSG-RAN WG1 #90bis, R1-1718433, Prague, Czech Republic, Oct. 9-13, 2017, 9 pages.
Extended European Search Report issued in European Application No. 19798936.1 dated May 21, 2021, 9 pages.
Intel Corporation, "Discussion on Interference Measurement for CSI," 3GPP TSG-RAN WG1 Meeting NR#3, R1-1716292, Nagoya, Japan, Sep. 18-21, 2017, 9 pages.
3GPP TS 38.213 V15.1 0 (Mar. 2018), "3rd Generation Partnership Project; Technical Specification Group Radio Access Network; NR; Physical layer procedures for control (Release 15)," Mar. 2018, 77 pages.
3GPP TS 38.331 V15.0.0 (Dec. 2017), 3rd Generation Partnership Project; Technical Specification Group Radio Access Network NR Radio Resource Control (RRC) protocol specification(Release 15), 188 pages.
3GPP TS 38.214 V15.1.0 (Mar. 2018), 3rd Generation Partnership Project; Technical Specification Group Radio Access Network; NR; Physical layer procedures for data (Release 15), 77 pages.
3GPP TS 38.211 V15.0.0 (Dec. 2017), 3rd Generation Partnership Project; Technical Specification Group Radio Access Network; NR; Physical channels and modulation(Release 15), 73 pages.
3GPP TS 38.321 V15.1.0 (Mar. 2018), 3rd Generation Partnership Project; Technical Specification Group Radio Access Network; NR; Medium Access Control (MAC) protocol specification (Release 15), 67 pages.
3GPP TS 38.212 V15.0.0 (Dec. 2017), 3rd Generation Partnership Project; Technical Specification Group Radio Access Network; NR; Multiplexing and channel coding(Release 15), 82 pages.
3GPP TS 38.331 V15.1.0 (Mar. 2018), 3rd Generation Partnership Project; Technical Specification Group Radio Access Network; NR; Radio Resource Control (RRC) protocol specification(Release 15), 268 pages.
3GPP TS 38.213 V15.0.0 (Dec. 2017), 3rd Generation Partnership Project; Technical Specification Group Radio Access Network; NR; Physical layer procedures for control(Release 15), 56 paes.
PCT International Search Report and Written Opinion issued in International Application No. PCT/CN2019/086447 dated Jul. 17, 2019, 15 pages (with English translation).
Office Action issued in Russian Application No. 2020140655/07 dated Jun. 23, 2022, 26 pages (with English translation).

* cited by examiner

BEAM TRAINING METHOD, APPARATUS, AND SYSTEM

CROSS-REFERENCE TO RELATED APPLICATIONS

This application is a continuation of International Application No. PCT/CN2019/086447, filed on May 10, 2019, which claims priority to Chinese Patent Application No. 201810451328.3, filed on May 11, 2018. The disclosures of the aforementioned applications are hereby incorporated by reference in their entireties.

TECHNICAL FIELD

This application relates to the field of communications technologies, in particular, to a beam-based communications technology in a communications system, and specifically to a beam training method, apparatus, and system in the communications system.

BACKGROUND

In a mobile communications system, transmission is performed through a beam, to be specific, a signal is sent in a specific direction in space, to achieve a higher antenna array gain. The beam may be implemented by using a technology such as beamforming (Beamforming). For example, an important direction in high frequency (high frequency, HF) communication is analog and digital hybrid beamforming (hybrid Beamforming). In this way, a loss of a high frequency signal caused by a transmission distance can be well combated against, and complexity and hardware costs can further be controlled within an acceptable range.

In beam-based communication, beam training needs to be performed between a transmit end and a receive end. In either of analog beamforming and digital and analog hybrid beamforming, weight values of analog beamforming at both the receive end and the transmit end need to be adjusted, so that a beam formed through the analog beamforming or the digital and analog hybrid beamforming can be aligned with a beam at a peer communication end, that is, beams are aligned, where a weight value of beamforming is usually obtained by sending a training signal. A beam training result determines whether a signal can be normally transmitted. With a higher communication quality requirement, in addition to the beam alignment, more factors in communication need to be considered in beam training, to improve communication quality.

SUMMARY

This application provides a beam training method, apparatus, and system, to perform beam training in consideration of another factor in communication, so that on-demand beam training can be effectively performed.

According to a first aspect, a beam training method and apparatus are provided.

In a possible design, the method is applied to a terminal device. A network side sends interference-related indication information to a terminal side, so that the terminal device considers a corresponding interference factor during beam selection, to implement effective on-demand beam training. The method includes: receiving interference-related indication information sent by a network device; receiving a downlink signal sent by the network device through two or more beams, where the two or more beams include a beam corresponding to interference; and sending, to the network device, information related to a selected beam, where the selected beam is a beam selected based on the interference-related indication information and a measurement result of the downlink signal. It may be understood that the interference is determined by the network device. Optionally, the network device may determine the interference based on whether there is a signal transmitted to another terminal device on the beam used to send the downlink signal to the terminal device, whether a beam is used as a serving beam to serve another terminal device, and the like, and send the interference-related indication information to the terminal device.

Optionally, the downlink signal includes but is not limited to a primary synchronization signal (Primary Synchronization Signal, PSS for short)/secondary synchronization signal (Secondary Synchronization Signal, SSS for short), a physical downlink control channel demodulation reference signal PDCCH-DMRS, a physical downlink shared channel demodulation reference signal PDSCH-DMRS, a phase tracking reference signal PTRS, a channel state information reference signal (Channel status information reference signal, CSI-RS for short), a cell signal (Cell Reference Signal, CRS for short) (which does not exist in new radio (New Radio, NR for short), a fine synchronization signal (Time/frequency tracking Reference Signal, TRS for short) (which does not exist in LTE), and the like.

In this design, the beam is selected in consideration of the interference factor in beam training, so that the effective on-demand beam training can be implemented.

Correspondingly, a beam training apparatus is provided. The apparatus can implement the corresponding method according to the first aspect. For example, the apparatus is limited in a functional form, and may be an entity on a terminal side. A specific implementation of the apparatus may be a terminal device. For example, the apparatus may be a terminal device, or a chip or a function module in a terminal device. The foregoing method may be implemented by software, hardware, or by hardware executing corresponding software.

In a possible design, the apparatus may include a processor and a memory. The processor is configured to support the apparatus in performing a corresponding function in the method according to the first aspect. The memory is configured to couple to the processor, and stores a program (an instruction) and data that are necessary for the apparatus. In addition, the apparatus may further include a communications interface, configured to support the apparatus in communicating with another network element. The communications interface may be a transceiver.

In a possible design, the apparatus may include a transceiver unit, and the transceiver unit is configured to communicate with a network device. The apparatus may further include a processing unit, and the processing unit is configured to select a beam based on interference-related indication information and a measurement result of the downlink signal.

According to a second aspect, a beam training method and apparatus are provided.

In a possible design, the method is applied to a network device, for example, an access node, or a transmission reception point having some functions of an access node on a network side. The network side sends interference-related indication information to a terminal side, so that a terminal device considers a corresponding interference factor during beam selection, to implement effective on-demand beam training. The method includes: sending interference-related indication information to the terminal device; sending a downlink signal to the terminal device through two or more beams, where the two or more beams include a beam corresponding to interference; and receiving information that is related to a beam selected by the terminal device and that is sent by the terminal device, where the selected beam is a beam selected by the terminal device based on the interference-related indication information and a measurement result of the downlink signal. It may be understood that the interference is determined by the network device. Optionally, the network device may determine the interference based on whether there is a signal transmitted to another terminal device on the beam used to send the downlink signal to the terminal device, whether a beam is used as a serving beam to serve another terminal device, and the like, and send the interference-related indication information to the terminal device.

Optionally, the downlink signal includes but is not limited to a primary synchronization signal (Primary Synchronization Signal, PSS for short)/secondary synchronization signal (Secondary Synchronization Signal, SSS for short), a downlink control channel demodulation reference signal PDCCH-DMRS, a downlink data channel demodulation reference signal PDSCH-DMRS, a phase noise tracking signal PTRS, a channel state information reference signal (Channel status information reference signal, CSI-RS for short), a cell signal (Cell Reference Signal, CRS for short) (which does not exist in NR), a fine synchronization signal (Time/frequency tracking Reference Signal, TRS for short) (which does not exist in LTE), and the like.

In this design, the beam is selected in consideration of the interference factor in beam training, so that the effective on-demand beam training can be implemented.

Correspondingly, a beam training apparatus is provided. The apparatus can implement the corresponding method according to the second aspect. For example, the apparatus is limited in a functional form, and may be an entity on an access side. A specific implementation of the apparatus may be an access node device. For example, the apparatus may be an access node device, or may be a chip or a function module in an access node device. The foregoing method may be implemented by software, hardware, or by hardware executing corresponding software.

In a possible design, the apparatus may include a processor and a memory. The processor is configured to support the apparatus in performing a corresponding function in the method according to the second aspect. The memory is configured to couple to the processor, and stores a program (an instruction) and data that are necessary for the apparatus. In addition, the apparatus may further include a communications interface, configured to support the apparatus in communicating with another network element. The communications interface may be a transceiver.

In a possible design, the apparatus may include a transceiver unit, and the transceiver unit is configured to: send interference-related indication information and a downlink signal to a terminal device, and receive beam-related information sent by the terminal device. The apparatus may further include a processing unit, and the processing unit is configured to determine the interference-related indication information.

Based on either of the technical solutions provided in the first aspect and the second aspect:

In a possible design, the interference-related indication information is used to indicate a transmission resource for a downlink signal sent through the beam corresponding to the interference, and/or a receive beam for receiving a downlink signal sent through the beam corresponding to the interference. Optionally, the receive beam includes a receive beam for receiving a downlink signal corresponding to non-interference, and the downlink signal corresponding to the non-interference is a downlink signal sent through a beam corresponding to the non-interference in the two or more beams. Optionally, that the interference-related indication information is used to indicate a receive beam for receiving a downlink signal sent through the beam corresponding to the interference includes: the interference-related indication information is used to indicate to receive, through the receive beam for receiving the downlink signal corresponding to the non-interference, the downlink signal sent through the beam corresponding to the interference. Correspondingly, the receiving a downlink signal sent by the network device through two or more beams includes: receiving, based on the interference-related indication information through the receive beam for receiving the downlink signal corresponding to the non-interference, the downlink signal sent through the beam corresponding to the interference. It may be understood that the interference-related indication information may indicate the terminal device to separately receive, through all receive beams for receiving downlink signals corresponding to the non-interference, downlink signals corresponding to the interference. Optionally, the interference-related indication information may alternatively indicate the terminal device to separately receive, through some receive beams for receiving downlink signals corresponding to the non-interference, downlink signals corresponding to the interference. Further, optionally, the interference-related indication information may alternatively indicate the terminal device to receive, through a receive beam for receiving a downlink signal corresponding to the non-interference, a downlink signal corresponding to the interference. In this design, the terminal device receives, through the receive beam for receiving the downlink signal corresponding to the non-interference, the downlink signal corresponding to the interference, so that the terminal device can obtain an amount of interference caused by the downlink signal corresponding to the interference to another downlink signal corresponding to the non-interference.

In a possible design, an indication manner of the interference-related indication information includes an explicit indication manner or an implicit indication manner. To perform the on-demand beam training in consideration of the interference factor, the network device may send the interference-related indication information to the terminal device in the explicit indication manner or the implicit indication manner.

In a possible design, the explicit indication manner includes: sending interference-related information. Optionally, the interference-related information includes at least one of the following: indication information for a transmission resource for sending a downlink signal through the beam corresponding to the interference, and indication information for a receive beam corresponding to the transmission resource. In this design, an operation of the terminal device can be simplified in the explicit indication manner.

In a possible design, the implicit indication manner includes: configuring the interference-related indication information, where the interference-related indication information includes indication information for a transmission resource for sending a downlink signal through the beam corresponding to the interference, and indication information for a receive beam for a downlink signal that corresponds to non-interference and that is in the downlink signal sent through the two or more beams; and the downlink signal corresponding to the non-interference is a downlink signal that is in the downlink signal and that is not sent through the beam corresponding to the interference. In this design, signaling overheads can be reduced in the implicit indication manner.

In a possible design, the related information includes at least one of the following: a resource index for a downlink signal sent through the selected beam, a received power RSRP for the downlink signal sent through the selected beam, and interference amount information of the interference. It may be understood that the terminal device may indicate the corresponding selected beam by reporting the resource index for the downlink signal, and may further report information such as the received power RSRP and an interference amount to the network device, for the network device to perform scheduling. Optionally, the interference amount may be a ratio of a received power for the downlink signal that is sent through the beam corresponding to the non-interference and that is received through a receive beam to a received power for the downlink signal that is sent through the beam corresponding to the interference and that is received through the same receive beam.

According to a third aspect, a beam training method and apparatus are provided.

In a possible design, the method is applied to a terminal device, and during beam selection, the terminal device selects, by considering a specific selection criterion for a beam to be reported in a group-based reporting manner, a beam to be reported in a group-based reporting manner, to implement effective on-demand beam training. The method includes: receiving, by the terminal device, a downlink signal sent by a network device through two or more beams; and sending, by the terminal device to the network device, information related to the selected beam to be reported in the group-based reporting manner in the beams, where the beam to be reported in the group-based reporting manner is a beam selected by the terminal device according to a downlink signal reception and selection criterion; and the selection criterion is that downlink signals sent through the selected beam to be reported in the group-based reporting manner are received by the terminal device by using a same receive parameter, or downlink signals sent through the selected beam to be reported in the group-based reporting manner are received by the terminal device by using different receive parameters. It may be understood that, if beam training is not performed as required, the selection criterion for the beam to be reported in the group-based reporting manner is not defined. In some scenarios, an unsuitable beam may exist in the to-be-reported beams and a network side does not know the existence of the unsuitable beam. Due to insufficient information for the network side, a scheduling error is caused.

Optionally, the downlink signal includes but is not limited to a primary synchronization signal (Primary Synchronization Signal, PSS for short)/secondary synchronization signal (Secondary Synchronization Signal, SSS for short), a downlink control channel demodulation reference signal PDCCH-DMRS, a downlink data channel demodulation reference signal PDSCH-DMRS, a phase noise tracking signal PTRS, a channel state information reference signal (Channel status information reference signal, CSI-RS for short), a cell signal (Cell Reference Signal, CRS for short) (which does not exist in NR), a fine synchronization signal (Time/frequency tracking Reference Signal, TRS for short) (which does not exist in LTE), and the like.

Optionally, the related information includes at least one of the following: a resource index for the downlink signal corresponding to the beam to be reported in the group-based reporting manner, a received power for the downlink signal corresponding to the beam to be reported in the group-based reporting manner, and an interference amount.

In this design, the beam is selected in consideration of the specific selection criterion for the beam to be reported in the group-based reporting manner in beam training, so that the effective on-demand beam training can be implemented.

In a possible design, the method further includes: receiving, by the terminal device, indication information that is for the selection criterion and that is sent by the network device. It may be understood that, for the on-demand beam training, the selection criterion may be configured by the network side.

In a possible design, the method further includes: sending, by the terminal device, indication information for the selection criterion to the network device. It may be understood that, for the on-demand beam training, the terminal device may autonomously select the selection criterion, and send the indication information for the selection criterion to the network device, so that the network side has sufficient information, and no scheduling error is caused.

In a possible design, the method further includes: receiving configuration information that is for a quantity of groups and/or a quantity of beams in each group in group-based reporting and that is sent by the network device. For the group-based reporting, optionally, the network side may configure group information, and optionally, a group configuration may alternatively be agreed on in a unified manner.

In a possible design, that the beam to be reported in the group-based reporting manner is a beam selected by the terminal device according to a downlink signal reception and selection criterion includes: measuring, by the terminal device, the received power for the downlink signal; and determining, based on a measurement result and the selection criterion, the beam to be reported in the group-based reporting manner. It may be understood that during the beam selection, the terminal device needs to consider signal quality in addition to the selection criterion for the beam to be reported in the group-based reporting manner.

Correspondingly, a beam training apparatus is provided. The apparatus can implement the corresponding method according to the third aspect. For example, the apparatus is limited in a functional form, and may be an entity on a terminal side. A specific implementation of the apparatus may be a terminal device. For example, the apparatus may be a terminal device, or a chip or a function module in a terminal device. The foregoing method may be implemented by software, hardware, or by hardware executing corresponding software.

In a possible design, the apparatus may include a processor and a memory. The processor is configured to support the apparatus in performing a corresponding function in the method according to the third aspect. The memory is configured to couple to the processor, and stores a program (an instruction) and data that are necessary for the apparatus. In addition, the apparatus may further include a communications interface, configured to support the apparatus in communicating with another network element. The communications interface may be a transceiver.

In a possible design, the apparatus may include a transceiver unit, and the transceiver unit is configured to communicate with a network device. The apparatus may further include a processing unit, and the processing unit is configured to select, according to a downlink signal reception and selection criterion, a beam to be reported in a group-based reporting manner.

According to a fourth aspect, a beam training method and apparatus are provided.

In a possible design, the method is applied to a network device, for example, an access node, or a transmission reception point having some functions of an access node on a network side. During beam training, a specific selection criterion for a beam to be reported in a group-based reporting manner is considered to select a beam to be reported in a group-based reporting manner, to implement effective on-demand beam training. The method includes: sending, by the network device, a downlink signal to a terminal device through two or more beams; and receiving, by the network device, information that is related to the beam to be reported in the group-based reporting manner in the beams and that is sent by the terminal device, where the beam to be reported in the group-based reporting manner is selected by the terminal device according to a downlink signal reception and selection criterion; and the selection criterion is that downlink signals sent through the selected beam to be reported in the group-based reporting manner are received by the terminal device by using a same receive parameter, or downlink signals sent through the selected beam to be reported in the group-based reporting manner are received by the terminal device by using different receive parameters. It may be understood that, if beam training is not performed as required, the selection criterion for the beam to be reported in the group-based reporting manner is not defined. In some scenarios, an unsuitable beam may exist in the to-be-reported beams and a network side does not know the existence of the unsuitable beam. Due to insufficient information for the network side, a scheduling error is caused.

Optionally, the downlink signal includes but is not limited to a primary synchronization signal (Primary Synchronization Signal, PSS for short)/secondary synchronization signal (Secondary Synchronization Signal, SSS for short), a downlink control channel demodulation reference signal PDCCH-DMRS, a downlink data channel demodulation reference signal PDSCH-DMRS, a phase noise tracking signal PTRS, a channel state information reference signal (Channel status information reference signal, CSI-RS for short), a cell signal (Cell Reference Signal, CRS for short) (which does not exist in NR), a fine synchronization signal (Time/frequency tracking Reference Signal, TRS for short) (which does not exist in LTE), and the like.

Optionally, the related information includes at least one of the following: a resource index for the downlink signal corresponding to the beam to be reported in the group-based reporting manner, a received power for the downlink signal corresponding to the beam to be reported in the group-based reporting manner, and an interference amount.

In this design, the beam is selected in consideration of the specific selection criterion for the beam to be reported in the group-based reporting manner in beam training, so that the effective on-demand beam training can be implemented.

In a possible design, the method further includes: sending, by the network device, indication information for the selection criterion to the terminal device. It may be understood that, for the on-demand beam training, the selection criterion may be configured by the network side.

In a possible design, the method further includes: receiving, by the network device, indication information that is for the selection criterion and that is sent by the terminal device. It may be understood that, for the on-demand beam training, the terminal device may autonomously select the selection criterion, and send the indication information for the selection criterion to the network device, so that the network side has sufficient information, and no scheduling error is caused.

In a possible design, the method further includes: sending, by the network device to the terminal device, configuration information that is for a quantity of groups and/or a quantity of beams in each group in group-based reporting. For the group-based reporting, optionally, the network side may configure group information, and optionally, a group configuration may alternatively be agreed on in a unified manner.

In a possible design, that the beam to be reported in the group-based reporting manner is selected by the terminal device according to a downlink signal reception and selection criterion includes: measuring, by the terminal device, the received power for the downlink signal; and determining, based on a measurement result and the selection criterion, the beam to be reported in the group-based reporting manner. It may be understood that during the beam selection, the terminal device needs to consider signal quality in addition to the selection criterion for the beam to be reported in the group-based reporting manner.

Correspondingly, a beam training apparatus is provided. The apparatus can implement the corresponding method according to the fourth aspect. For example, the apparatus is limited in a functional form, and may be an entity on an access side. A specific implementation of the apparatus may be an access node device. For example, the apparatus may be an access node device, or may be a chip or a function module in an access node device. The foregoing method may be implemented by software, hardware, or by hardware executing corresponding software.

In a possible design, the apparatus may include a processor and a memory. The processor is configured to support the apparatus in performing a corresponding function in the method according to the fourth aspect. The memory is configured to couple to the processor, and stores a program (an instruction) and data that are necessary for the apparatus. In addition, the apparatus may further include a communications interface, configured to support the apparatus in communicating with another network element. The communications interface may be a transceiver.

In a possible design, the apparatus may include a transceiver unit, and the transceiver unit is configured to communicate with a terminal device. The apparatus may further include a processing unit, and the processing unit is configured to perform corresponding processing (for example, determine beam configuration information, or determine a selection criterion).

According to a fifth aspect, a beam training method and apparatus are provided.

In a possible design, the method is applied to a terminal device, and the terminal device considers a transport stream factor during beam selection, to implement effective on-demand beam training. The method includes: receiving, by the terminal device, a downlink signal sent by a network device through one or more beams; and sending, by the terminal device to the network device, information related to a beam that is selected to be reported in the one or more beams, where the to-be-reported beam is a transmit beam that is for a downlink signal corresponding to a channel satisfying a rank condition and that is determined by the terminal device based on the downlink signal. It may be understood that a system capacity can be flexibly used in consideration of the transport stream factor.

Optionally, the downlink signal includes but is not limited to a primary synchronization signal (Primary Synchronization Signal, PSS for short)/secondary synchronization signal (Secondary Synchronization Signal, SSS for short), a downlink control channel demodulation reference signal PDCCH-DMRS, a downlink data channel demodulation reference signal PDSCH-DMRS, a phase noise tracking signal PTRS, a channel state information reference signal (Channel status information reference signal, CSI-RS for short), a cell signal (Cell Reference Signal, CRS for short) (which does not exist in NR), a fine synchronization signal (Time/frequency tracking Reference Signal, TRS for short) (which does not exist in LTE), and the like.

In this design, the beam is selected in consideration of the transport stream factor in beam training, so that the effective on-demand beam training can be implemented.

In a possible design, the method further includes: receiving, by the terminal device, indication information that is for the rank condition and that is sent by the network device. It may be understood that, for the on-demand beam training, a transport stream may be configured by a network side.

In a possible design, the method further includes: sending, by the terminal device, indication information for the rank condition to the network device. It may be understood that, for the on-demand beam training, the terminal device may autonomously select a selection criterion, and send the indication information for the selection criterion to the network device, so that the network side has sufficient information, and no scheduling error is caused.

In a possible design, the method further includes: if no corresponding channel determined based on the downlink signal satisfies the rank condition, sending, by the terminal device, abnormality indication information to the network device.

In a possible design, the sending, by the terminal device to the network device, information related to a beam that is selected to be reported in the one or more beams includes: sending, by the terminal device to the network device in a group-based reporting manner, the information related to the beam that is selected to be reported in the one or more beams. Time-frequency resources that need to be reserved by the terminal device can be reduced in the group-based reporting manner, thereby greatly improving resource utilization.

Correspondingly, a beam training apparatus is provided. The apparatus can implement the corresponding method according to the fifth aspect. For example, the apparatus is limited in a functional form, and may be an entity on a terminal side. A specific implementation of the apparatus may be a terminal device. For example, the apparatus may be a terminal device, or a chip or a function module in a terminal device. The foregoing method may be implemented by software, hardware, or by hardware executing corresponding software.

In a possible design, the apparatus may include a processor and a memory. The processor is configured to support the apparatus in performing a corresponding function in the method according to the fifth aspect. The memory is configured to couple to the processor, and stores a program (an instruction) and data that are necessary for the apparatus. In addition, the apparatus may further include a communications interface, configured to support the apparatus in communicating with another network element. The communications interface may be a transceiver.

In a possible design, the apparatus may include a transceiver unit, and the transceiver unit is configured to communicate with a network device. The apparatus may further include a processing unit. The processing unit is configured to determine, based on a downlink signal, whether a rank (Rank) of a corresponding channel satisfies a rank condition, to select a to-be-reported beam.

According to a sixth aspect, a beam training method and apparatus are provided.

In a possible design, the method is applied to a network device, for example, an access node, or a transmission reception point having some functions of an access node on a network side. A transport stream factor is considered during beam training to implement effective on-demand beam training. The method includes: sending, by the network device, a downlink signal to a terminal device through one or more beams; and receiving, by the network device, information that is related to a beam selected to be reported in the one or more beams and that is sent by the terminal device, where the to-be-reported beam is a transmit beam that is for a downlink signal corresponding to a channel satisfying a rank condition and that is determined by the terminal device based on the downlink signal. It may be understood that a system capacity can be flexibly used in consideration of the transport stream factor.

Optionally, the downlink signal includes but is not limited to a primary synchronization signal (Primary Synchronization Signal, PSS for short)/secondary synchronization signal (Secondary Synchronization Signal, SSS for short), a downlink control channel demodulation reference signal PDCCH-DMRS, a downlink data channel demodulation reference signal PDSCH-DMRS, a phase noise tracking signal PTRS, a channel state information reference signal (Channel status information reference signal, CSI-RS for short), a cell signal (Cell Reference Signal, CRS for short) (which does not exist in NR), a fine synchronization signal (Time/frequency tracking Reference Signal, TRS for short) (which does not exist in LTE), and the like.

In this design, the beam is selected in consideration of the transport stream factor in beam training, so that the effective on-demand beam training can be implemented.

In a possible design, the method further includes: sending, by the network device, indication information for the rank condition to the terminal device. It may be understood that, for the on-demand beam training, a transport stream may be configured by the network side.

In a possible design, the method further includes: receiving, by the network device, indication information that is for the rank condition and that is sent by the terminal device. It may be understood that, for the on-demand beam training, the terminal device may autonomously select the selection criterion, and send the indication information for the selection criterion to the network device, so that the network side has sufficient information, and no scheduling error is caused.

In a possible design, the method further includes: receiving, by the network device, abnormality indication information sent by the terminal device, where the abnormality indication information is sent by the terminal device when the terminal device determines, based on the downlink signal, that there is no corresponding channel satisfying the rank condition.

In a design, the receiving, by the network device, information that is related to a beam selected to be reported in the one or more beams and that is sent by the terminal device includes: receiving, by the network device, the information that is related to the beam selected to be reported in the one or more beams and that is reported by the terminal device in a group-based reporting manner. Time-frequency resources that need to be reserved by the terminal device can be reduced in the group-based reporting manner, thereby greatly improving resource utilization.

Correspondingly, a beam training apparatus is provided. The apparatus can implement the corresponding method according to the sixth aspect. For example, the apparatus is limited in a functional form, and may be an entity on an access side. A specific implementation of the apparatus may be an access node device. For example, the apparatus may be an access node device, or may be a chip or a function module in an access node device. The foregoing method may be implemented by software, hardware, or by hardware executing corresponding software.

In a possible design, the apparatus may include a processor and a memory. The processor is configured to support the apparatus in performing a corresponding function in the method according to the sixth aspect. The memory is configured to couple to the processor, and stores a program (an instruction) and data that are necessary for the apparatus. In addition, the apparatus may further include a communications interface, configured to support the apparatus in communicating with another network element. The communications interface may be a transceiver.

In a possible design, the apparatus may include a transceiver unit, and the transceiver unit is configured to communicate with a terminal device. The apparatus may further include a processing unit, and the processing unit is configured to perform corresponding processing (for example, determine indication information for a rank condition).

The foregoing six aspects provide the technical solutions of beam training in a downlink direction, and the following provides technical solutions of beam training in an uplink direction.

According to a seventh aspect, a beam training method and apparatus are provided.

In a possible design, the method is applied to a terminal device, and the terminal device considers a gain factor during uplink beam selection according to a gain adjustment indication of a network device, to implement effective on-demand beam training. The method includes: sending, by the terminal device, a first uplink signal to the network device; receiving, by the terminal device, the gain adjustment indication sent by the network device, where the gain adjustment indication is determined by the network device by measuring the first uplink signal; and sending, by the terminal device, a second uplink signal to the network device, where the second signal is an uplink signal sent by the terminal device after the terminal device performs gain adjustment on an antenna according to the gain adjustment indication.

Optionally, the uplink signal includes but is not limited to a channel sounding signal (Sounding Reference Signal, SRS for short), a physical uplink control channel demodulation reference signal (PUCCH De-modulation Reference Signal, PUCCH-DMRS for short), an uplink data channel demodulation reference signal PUS CH-DMRS, an uplink phase noise tracking signal (phase noise tracking reference signal, PTRS for short), and the like.

In this design, the beam is selected in consideration of the gain adjustment factor in uplink beam training, so that the effective on-demand beam training can be implemented.

In a possible design, the terminal device may perform omnidirectional sweeping in space, or may perform narrow beam sweeping in a wide beam range as indicated by the network device. In this application, the terminal device sweeps a plurality of high-gain narrow beams in space, that is, sends uplink signals through different high-gain narrow beams. Optionally, before the sending a second uplink signal to the network device, the method further includes: receiving an indication for information that is related to a beam used by the terminal device to send the second uplink signal and that is sent by the network device, where the transmit beam indication includes at least one of the following: a resource index for sending the first uplink signal, beam-related information of random access in an access process, and an ID of a resource/an SSB of a corresponding reciprocity-based CSI-RS. The resource index for the first uplink signal and the beam-related information of the random access in the access process may be used to indicate a wide beam that has been used by the terminal device previously, to provide a specific reference for the terminal device, so that spatial sweeping of the terminal device can focus on a specific wide beam range.

Correspondingly, a beam training apparatus is provided. The apparatus can implement the corresponding method according to the seventh aspect. For example, the apparatus is limited in a functional form, and may be an entity on a terminal side. A specific implementation of the apparatus may be a terminal device. For example, the apparatus may be a terminal device, or a chip or a function module in a terminal device. The foregoing method may be implemented by software, hardware, or by hardware executing corresponding software.

In a possible design, the apparatus may include a processor and a memory. The processor is configured to support the apparatus in performing a corresponding function in the method according to the seventh aspect. The memory is configured to couple to the processor, and stores a program (an instruction) and data that are necessary for the apparatus. In addition, the apparatus may further include a communications interface, configured to support the apparatus in communicating with another network element. The communications interface may be a transceiver.

In a possible design, the apparatus may include a transceiver unit, and the transceiver unit is configured to communicate with a network device. The apparatus may further include a processing unit, and the processing unit is configured to determine gain adjustment.

According to an eighth aspect, a beam training method and apparatus are provided.

In a possible design, the method is applied to a network device, for example, an access node, or a transmission reception point having some functions of an access node on a network side. A terminal device considers a gain factor during uplink beam selection according to a gain adjustment indication of the network device, to implement effective on-demand beam training. The method includes: receiving, by the network device, a first uplink signal sent by the terminal device; sending, by the network device, the gain adjustment indication to the terminal device, where the gain adjustment indication is an indication determined by the network device by measuring the first uplink signal; and receiving, by the network device, a second uplink signal sent by the terminal device, where the second signal is an uplink signal sent after gain adjustment on an antenna according to the gain adjustment indication.

Optionally, the uplink signal includes but is not limited to a channel sounding signal (Sounding Reference Signal, SRS for short), an uplink control channel demodulation reference signal (PUCCH De-modulation Reference Signal, PUCCH-DMRS for short), an uplink data channel demodulation reference signal PUSCH-DMRS, an uplink phase noise tracking signal (phase noise tracking reference signal, PTRS for short), and the like.

In this design, the beam is selected in consideration of the gain adjustment factor in uplink beam training, so that the effective on-demand beam training can be implemented.

In a possible design, the terminal device may perform omnidirectional sweeping in space, or may perform narrow beam sweeping in a wide beam range as indicated by the network device. In this application, the terminal device sweeps a plurality of high-gain narrow beams in space, that is, sends uplink signals through different high-gain narrow beams. Optionally, before the receiving, by the network device, a second uplink signal sent by the terminal device, the method further includes: sending, by the network device to the terminal device, an indication for information related to a beam used by the terminal device to send the second uplink signal, where the transmit beam indication includes at least one of the following: a resource index for sending the first uplink signal, beam-related information of random access in an access process, and an ID of a resource/an SSB of a corresponding reciprocity-based CSI-RS. The resource index for the first uplink signal and the beam-related information of the random access in the access process may be used to indicate a wide beam that has been used by the terminal device previously, to provide a specific reference for the terminal device, so that spatial sweeping of the terminal device can focus on a specific wide beam range.

Correspondingly, a beam training apparatus is provided. The apparatus can implement the corresponding method according to the eighth aspect. For example, the apparatus is limited in a functional form, and may be an entity on an access side. A specific implementation of the apparatus may be an access node device. For example, the apparatus may be an access node device, or may be a chip or a function module in an access node device. The foregoing method may be implemented by software, hardware, or by hardware executing corresponding software.

In a possible design, the apparatus may include a processor and a memory. The processor is configured to support the apparatus in performing a corresponding function in the method according to the eighth aspect. The memory is configured to couple to the processor, and stores a program (an instruction) and data that are necessary for the apparatus. In addition, the apparatus may further include a communications interface, configured to support the apparatus in communicating with another network element. The communications interface may be a transceiver.

In a possible design, the apparatus may include a transceiver unit, and the transceiver unit is configured to communicate with a terminal device. The apparatus may further include a processing unit, and the processing unit is configured to determine gain adjustment by measuring a first uplink signal.

Based on either of the technical solutions provided in the seventh aspect and the eighth aspect:

In a possible design, an indication manner of the gain adjustment includes an explicit indication manner or an implicit indication manner. To perform the on-demand beam training in consideration of the gain adjustment factor, the network device may send the gain adjustment indication to the terminal device in the explicit indication manner or the implicit indication manner.

In a possible design, the explicit indication manner includes: sending indication information for a target antenna gain, or sending indication information for an adjustment factor of an antenna gain. An operation of the terminal device can be simplified in the explicit indication manner.

In a possible design, the implicit indication method includes: sending a calculation parameter used by the terminal device to determine a transmit power, where the calculation parameter is used to enable the transmit power determined by the terminal device to exceed a preset transmit power threshold. In other words, in the implicit indication manner, the terminal device determines the transmit power that exceeds the threshold, so that the terminal device increases a transmit antenna gain to avoid exceeding the threshold, thereby adjusting the gain. The calculation parameter includes at least one of the following: a value P0 specified by the network device, a scaling coefficient $\alpha$ indicated by the network device, and a path loss estimation reference. Alternatively, optionally, the implicit indication method includes: sending a first calculation parameter and a second calculation parameter that are used by the terminal device to determine a transmit power, where a difference between the first calculation parameter and the second calculation parameter is a gain adjustment amount of the antenna. The first calculation parameter includes a value P0_1 specified by the network device, and the second calculation parameter includes a value P0_2 specified by the network device. Alternatively, optionally, the implicit indication method includes: sending a received power and a target received power at which the network device receives the first uplink signal, so that the terminal device adjusts the gain based on the target received power, to achieve the target received power. Signaling overheads can be reduced in the implicit indication manner.

This application further provides a computer storage medium. The computer storage medium stores a computer program (an instruction). When the program (instruction) is run on a computer, the computer is enabled to perform the method according to any one of the foregoing aspects.

This application further provides a computer program product. When the computer program product is run on a computer, the computer is enabled to perform the method according to any one of the foregoing aspects.

This application further provides a chip. The chip stores an instruction, and when the instruction is run on a communications device, the communications device is enabled to perform the corresponding methods according to the foregoing aspects.

This application further provides an apparatus. The apparatus includes a memory, a processor, and a computer program that is stored in the memory and that can be run on the processor. When executing the computer program, the processor implements the corresponding methods according to the foregoing aspects.

This application further provides an apparatus. The apparatus includes a processor. The processor is configured to: couple to a memory, read an instruction in the memory, and implement, according to the instruction, the corresponding methods according to the foregoing aspects. It may be understood that the memory may be integrated into the processor, or may be independent of the processor.

This application further provides an apparatus. The apparatus includes a processor. When executing a computer program, the processor implements the corresponding methods according to the foregoing aspects. The processor may be a special purpose processor.

This application further provides a system, including the foregoing provided terminal-side apparatus and the foregoing provided network-side apparatus. The system components separately implement the corresponding methods according to the foregoing aspects.

It may be understood that any apparatus, computer storage medium, computer program product, chip, or system provided above is configured to implement the corresponding method provided above. Therefore, for beneficial effects that can be achieved by the apparatus, computer storage medium, computer program product, chip, or system, refer

DESCRIPTION OF EMBODIMENTS

Figure 1:
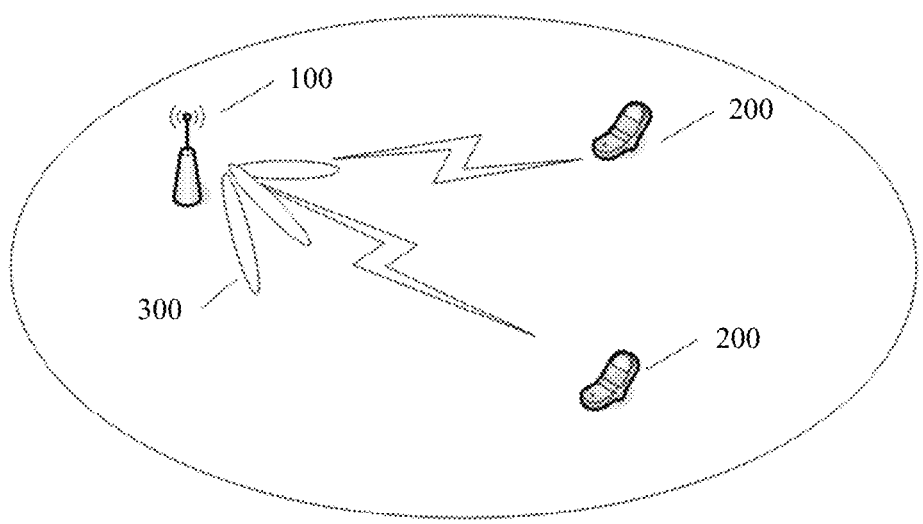
FIG. 1 shows an architecture of a network system in this application.

To make the technical problems resolved, the technical solutions used, and the technical effects achieved in this application clearer, the following describes the technical solutions in this application with reference to the accompanying drawings in the embodiments. The detailed descriptions provide various embodiments of a device and/or a process by using block diagrams, flowcharts, and/or examples. These block diagrams, flowcharts, and/or examples include one or more functions and/or operations, so that a person skilled in the art may understand that each function and/or operation in the block diagrams, the flowcharts, and/or the examples may be performed independently and/or jointly by using much hardware, software, firmware, and/or any combination thereof.

"A plurality of" in this application refers to two or more than two. The term "and/or" in this application describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In this application, the terms "first", "second", "third", "fourth", and the like are intended to distinguish between different objects but do not indicate a particular order of the objects.

In this application, nouns "network" and "system" are usually interchangeably used, but a person skilled in the art can understand meanings of the nouns. In some cases, all "terminals"/"terminal devices" mentioned in this application may be mobile devices, for example, mobile phones, personal digital assistants, handheld or laptop computers, and similar devices having a telecommunications capability. In some cases, the "terminals"/"terminal devices" may alternatively be wearable devices or vehicle-mounted devices, and include terminals in a future 5G network, terminals in a future evolved PLMN, or the like. Such a terminal may include a device and a removable storage module (for example, including but not limited to, a subscriber identification module (Subscriber Identification Module, SIM for short) application, a universal subscriber identification module (Universal Subscriber Identification Module, USIM for short) application, or a universal integrated circuit card (Universal Integrated Circuit Card, UICC for short) of a removable user identity module (Removable User Identity Module, R-UIM for short) application) associated with the device. Alternatively, such a terminal may include a device that does not have the module. In another case, the term "terminal"/"terminal device" may be a non-portable device having a similar capability, for example, a desktop computer, a set top box, or a network device. The term "terminal"/"terminal device" may alternatively be any hardware or software component that can terminate a communication session of a user. In addition, "user terminal", "User Equipment", "UE", "site", "station", "STA", "user device", "user agent", "User Agent", "UA", "user apparatus", "mobile device", and "device" are substitute terms that are synonymous with the "terminal"/"terminal device" in this specification. For ease of description, in this application, the foregoing devices are collectively referred to as user equipment or UE.

An "access node" mentioned in this application is a network device, is an apparatus deployed in a radio access network to provide a wireless communication function for a terminal device, and has functions such as being responsible for scheduling and configuring a downlink signal for UE. The access node may include various forms of macro base stations, micro base stations, relay stations, access points, and the like, may be a base transceiver station (Base Transceiver Station, BTS for short) in global system for mobile communications (Global System of Mobile communications, GSM for short) or code division multiple access (Code Division Multiple Access, CDMA for short), or a NodeB (NodeB, NB for short) in wideband code division multiple access (Wideband Code Division Multiple Access, WCDMA for short), or an evolved NodeB (Evolved Node B, eNB or eNodeB for short) in long term evolution (Long Term Evolution, LTE for short), or a relay station or an access point, or a transmission node or transmission reception point (transmission reception point, TRP or TP for short) in an NR (New Radio, NR for short) system, or a next generation NodeB (generation nodeB, gNB for short), a wireless fidelity (Wireless-Fidelity, Wi-Fi for short) site, a wireless backhaul node, a small cell, or a micro base station, or a base station in a 5th generation mobile communications (5th Generation Mobile Communication, 5G for short) network, or the like. This is not limited in this application. In systems using different radio access technologies, a device having an access node function may have different names. For ease of description, in this application, the foregoing apparatuses providing a wireless communication function for UE are collectively referred to as the access node.

In this application, beam-based communication means that in a mobile communications system, transmission is performed by using a beam, to be specific, a signal is sent in a specific direction in space, to achieve a higher antenna array gain. The beam may be implemented by using a technology such as beamforming (Beamforming). For example, an important research direction in high frequency (high frequency, HF for short) communication is analog and digital hybrid beamforming (hybrid Beamforming). In this way, a loss of a high frequency signal caused by a transmission distance can be well combated against, and complexity and hardware costs can further be controlled within an acceptable range.

In the technologies in this application, related terms are defined as follows:

Quasi-co-location (quasi-co-location, QCL for short): A quasi-co-location relationship is used to indicate that a plurality of resources have one or more same or similar communication features. A same or similar communication configuration may be used for the plurality of resources having the quasi-co-location relationship. For example, if two antenna ports have a quasi-co-location relationship, a large-scale property of a channel over which a signal is transmitted on one port may be inferred from a large-scale property of a channel over which a signal is transmitted on the other port. The large-scale property may include delay spread, an average delay, Doppler spread, Doppler frequency shift, an average gain, a receive parameter, a receive beam number of a terminal device, transmit/receive channel correlation, an angle of arrival, spatial correlation of a receiver antenna, a dominant angle of arrival (Angle-of-Arrival, AoA), an average angle of arrival, AoA spread, and the like. Specifically, that a quasi-co-location indication is used to indicate whether at least two groups of antenna ports have the quasi-co-location relationship is: The quasi-co-location indication is used to indicate whether channel state information reference signals sent on the at least two groups of antenna ports are from a same transmission point; or the quasi-co-location indication is used to indicate whether channel state information reference signals sent on the at least two groups of antenna ports are from a same beam group.

Quasi-co-location assumption (QCL assumption): It is assumed whether a QCL relationship exists between two ports. A configuration and an indication for the quasi-co-location assumption may be used to help a receive end receive and demodulate a signal. For example, the receive end can determine that a QCL relationship exists between a port A and a port B. In other words, a large-scale parameter of a signal measured on the port A may be used to measure and demodulate a signal on the port B.

Beam (beam): A beam is a communication resource. The beam may be a wide beam, a narrow beam, or a beam of another type. A technology for forming a beam may be a beamforming technology or another technical means. The beamforming technology may be specifically a digital beamforming technology, an analog beamforming technology, or a digital/analog hybrid beamforming technology. Different beams may be considered as different resources. Same information or different information may be sent through different beams. Optionally, a plurality of beams having same or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted through an antenna, and a receive beam may be distribution of signal strength, in different directions in space, of a radio signal received from an antenna. It may be understood that, one or more antenna ports forming one beam may also be considered as one antenna port set. In a protocol, a beam may also be referred to as a spatial filter (spatial filter).

Beam information may be identified by using index information. Optionally, the index information may correspond to a resource identifier of configured for the UE. For example, the index information may correspond to an ID or a resource configured for channel state information reference signal (Channel status information Reference Signal, CSI-RS for short), or may correspond to an ID or a resource of configured for uplink sounding reference signal (Sounding Reference Signal, SRS for short). Alternatively, optionally, the index information may be index information explicitly or implicitly carried by a signal or a channel carried through a beam. For example, the index information may be index information of the beam indicated by a synchronization signal or a broadcast channel sent through the beam.

Alternatively, optionally, the beam information may be identified by using an absolute index of the beam, a relative index of the beam, a logical index of the beam, an index of an antenna port corresponding to the beam, an index of an antenna port group corresponding to the beam, a time index of a downlink synchronization signal block; beam pair link (beam pair link, BPL) information, a transmit parameter (Tx parameter) corresponding to the beam, a receive parameter (Rx parameter) corresponding to the beam, a transmit weight (weight) corresponding to the beam, a weight matrix (weight matrix), a weight vector (weight vector), a receive weight corresponding to the beam, or indexes thereof a sending codebook (codebook) corresponding to the beam, a receiving codebook corresponding to the beam, or indexes thereof.

Spatial quasi-co-location (spatial QCL): The spatial QCL may be considered as a type of QCL. Spatial may be understood from two perspectives: a transmit end or a receive end. From the perspective of the transmit end, if two antenna ports are spatial quasi-co-location, it means that beam directions corresponding to the two antenna ports are the same in space. From the perspective of the receive end, if two antenna ports are spatial quasi-co-location, it means that the receive end can receive, in a same beam direction, signals sent on the two antenna ports.

FIG. 1 shows an architecture of a network system in this application. This application is applicable to a beam 300-based multi-carrier communications system, for example, 5G new radio (New Radio, NR for short), shown in FIG. 1. The system includes uplink (from UE 200 to an access node 100) communication and downlink (from the access node 100 to the UE 200) communication in the communications system. Both the uplink communication and the downlink communication are performed based on a beam 300 that is directed to a spatial direction. According to a long term evolution (Long Term Evolution, LTE for short)/NR protocol, the uplink communication at a physical layer includes transmission of an uplink physical channel and transmission of an uplink signal. The uplink physical channel includes a random access channel (Random access channel, PRACH for short), a physical uplink control channel (Physical uplink control channel, PUCCH for short), a physical uplink shared channel (Physical uplink shared channel, PUSCH for short), and the like. The uplink signal includes a channel sounding signal SRS, an uplink control channel demodulation reference signal (PUCCH De-modulation Reference Signal, PUCCH-DMRS for short), an uplink data channel demodulation reference signal PUSCH-DMRS, an uplink phase noise tracking signal (phase noise tracking reference signal, PTRS for short), and the like. The downlink communication includes transmission of a downlink physical channel and transmission of a downlink signal. The downlink physical channel includes a broadcast channel (Physical broadcast channel, PBCH for short), a downlink control channel (Physical downlink control channel, PDCCH for short), a downlink data channel (Physical downlink shared channel, PDSCH for short), and the like. The downlink signal includes a primary synchronization signal (Primary Synchronization Signal, PSS for short)/secondary synchronization signal (Secondary Synchronization Signal, SSS for short), a downlink control channel demodulation reference signal PDCCH-DMRS, a downlink data channel demodulation reference signal PDSCH-DMRS, a phase noise tracking signal PTRS, a channel state information reference signal (Channel status information reference signal, CSI- RS), a cell signal (Cell Reference Signal, CRS for short) (which does not exist in NR), a fine synchronization signal (Time/frequency tracking Reference Signal, TRS for short) (which does not exist in LTE), and the like.

In beam-based communication, beam training needs to be performed between the access node 100 and the UE 200. In an initial access process, after the beam training, the access node 100 and the UE 200 reach preliminary beam alignment, and then the UE 200 can access a network. In a beam alignment process, to be brief, the access node 100 configures a group of reference signals and/or synchronization signal blocks and sends the group of reference signals and/or synchronization signal blocks through different transmit beams to the UE 200 for measurement, and the UE 200 receives the group of reference signals and/or synchronization signal blocks through a receive beam, and selects one or more of the transmit beams for feedback to the access node 100. After the UE 200 accesses the network, in consideration of factors such as movement and an environment change of the UE 200, beam training aiming at beam management still needs to be performed between the access node 100 and the UE 200, to ensure communication quality. The beam management includes uplink beam management and downlink beam management. The uplink beam management is mainly classified into two types: uplink signal-based uplink beam management and downlink signal-based uplink beam management. The uplink signal-based uplink beam management usually does not require a beam consistency assumption, but the downlink signal-based uplink beam management usually requires a beam consistency assumption. In the uplink signal-based uplink beam management (where for example, an uplink signal is an SRS), the access node 100 may configure an SRS resource set (SRS resource set) for the UE 200, to indicate that a function of the set is beam management (SetUse=BeamManagement), and indicate whether the UE 200 needs to use a same transmit beam or different transmit beams to send SRSs on different SRS resources. If the access node 100 indicates the UE 200 to use a same transmit beam, the SRS resource set may be used to train a receive beam on an access node 100 side. If the access node 100 indicates the UE 200 to use different transmit beams, the SRS resource set may be used to train a transmit beam on a UE 200 side. In the downlink signal-based beam management, beam training between the access node 100 and the UE 200 is mainly completed through measurement and feedback on a downlink signal. Based on beam consistency, a receive beam selected for a terminal side after the downlink training may be used as a reference of a transmit beam for uplink transmission.

In this application, in the system shown in FIG. 1, more factors in communication are considered in the beam training between the access node 100 and the UE 200. For example, an interference factor is considered in the downlink beam management. The access node 100 obtains prior information and learns that one or more signals are being transmitted through one or more beams 300. After the UE 200 accesses the network, if the access node 100 sends a downlink signal to the UE 200 through the beam 300, the access node 100 uses the beam 300 as interference, and sends interference-related indication information to the UE 200, to indicate, in an explicit or implicit indication manner, the UE 200 to consider the interference factor when the UE 200 selects a beam. If a refinement factor that the UE 200 receives a downlink signal sent by the access node 100 through different beams 300 is considered in the downlink beam management, during beam selection, the UE 200 selects, according to a refined selection criterion, a beam to be reported in a group-based reporting manner, to be specific, the UE 200 receives the downlink signal by using a same receive parameter or different receive parameters. The selection criterion may be preconfigured by the access node 100 for the UE 200. Alternatively, the UE 200 may autonomously select the selection criterion, and send indication information for the selection criterion to the access node 100, so that a network side has sufficient information, and no scheduling error is caused. If a transport stream factor of the access node 100 is considered in the downlink beam management, the UE 200 selects a beam by considering the transport stream factor based on channel estimation. A transport stream condition may be preconfigured by the access node 100 for the UE 200 by using a rank (Rank) indication. Alternatively, the UE 200 may autonomously select a transport stream condition, and send indication information for the rank condition to the access node 100, so that the network side has sufficient information, and no scheduling error is caused. If an uplink coverage factor is considered in the uplink beam management, the access node 100 determines, based on quality of a previously received uplink signal that is sent by the UE 200, whether gain adjustment needs to be performed on a subsequent uplink beam of the UE 200, to enhance uplink coverage without adjusting an uplink transmit power. When determining that the UE 200 needs to adjust a gain of a transmit antenna, the access node 100 sends a gain adjustment indication to the UE 200, and the UE 200 adjusts the gain of the antenna based on the gain adjustment indication and then sends an uplink signal.

In this application, both uplink beam training and downlink beam training are performed as required based on different considerations, so that a higher communication quality requirement can be satisfied. It should be noted that, FIG. 1 shows merely an example of the architecture of the network system in this application, and this application is not limited thereto.

Embodiment 1

Figure 2:
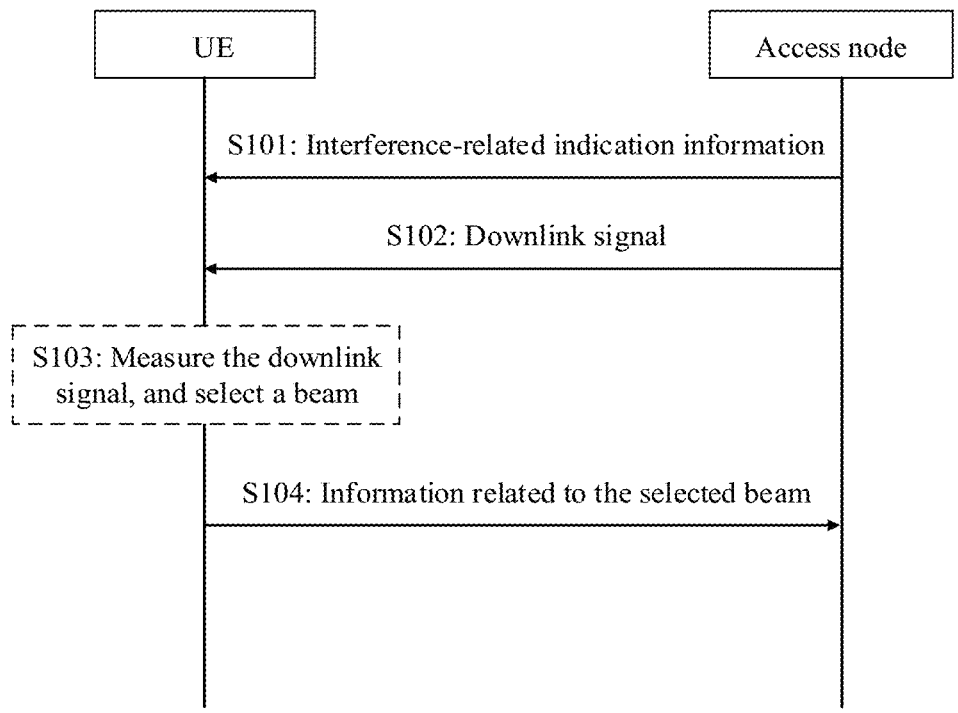
FIG. 2 is a flowchart of an embodiment of a beam training method according to this application.

In a network, UE establishes a connection to an access node, and the UE and the access node perform beam training by using a method in this embodiment, so that when selecting a beam, the UE considers a specific factor, such as an interference factor. In this way, during scheduling, the access node can provide a communication service having higher quality for the UE. It should be noted that interaction between the UE and the access node is used as an example for description in this embodiment and subsequent embodiments, and this application is not limited thereto. When a transmission reception point TRP managed by the access node in the network has some functions related to the access node, this application may further be applied to a scenario in which the UE interacts with the TRP to perform beam training. According to this embodiment of this application, FIG. 2 is a flowchart of an embodiment of a beam training method according to this application. For ease of understanding of the solution, behavior on both a UE side and an access node side is described in this embodiment and the subsequent embodiments, and is described as a whole from perspectives of all the interaction sides. However, it is not limited to a case in which an improvement in a system is that steps on all the interaction sides need to be performed together. The technical solution provided in this application has improvements on all the sides in the system.

The method includes the following steps.

S101: The access node sends interference-related indication information to the UE.

Figure 3:
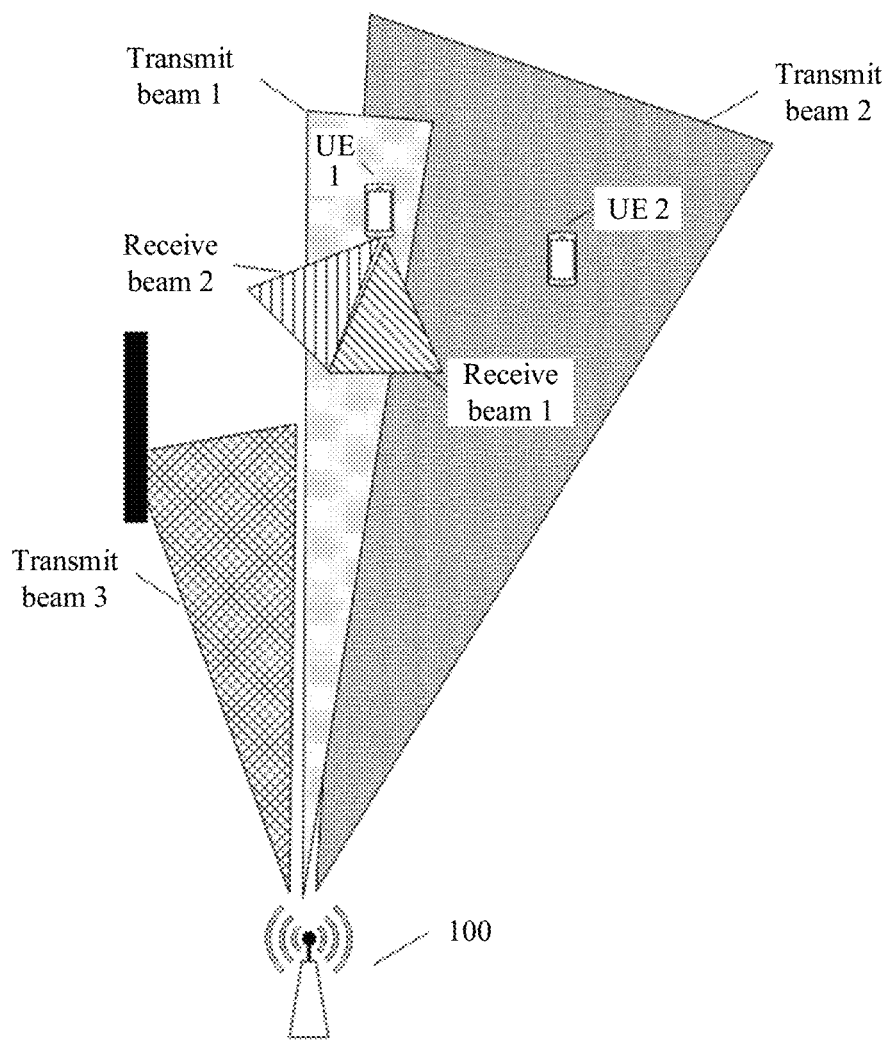
FIG. 3 is a schematic diagram of a beam-based communication scenario according to this application.

When the access node transmits signals to different UEs through different beams, the signals transmitted through the different beams may interfere with each other. Even if strength of a signal transmitted through one beam is relatively good, communication quality may be degraded due to strong interference. After the UE accesses a network, the access node may determine, in beams used for the training performed by the UE and based on a case in which a signal is still transmitted through a beam and another case, that the beam is an object of the interference-related indication information, and send the interference-related indication information to the UE. A scenario in which interference exists is shown in FIG. 3. FIG. 3 is a schematic diagram of a beam-based communication scenario. An access node 100 transmits data to UE 2 through a transmit beam 2. In addition, the access node 100 provides a beam training resource for UE 1, and the access node 100 sends interference-related indication information to the UE 1, to indicate that the UE 1 needs to consider, when performing beam training, interference caused by the transmit beam 2. For the UE 1, if the interference is not considered, because a transmit beam 1 and a receive beam 1 (a receive parameter 1) of the UE 1 are line of sight (LOS) aligned, a communications link including the transmit beam 1 and the receive beam 1 (the receive parameter 1) has minimum attenuation. However, because a transmit beam 3 and a receive beam 2 (a receive parameter 2) are reflection path aligned, a communications link including the transmit beam 3 and the receive beam 2 (the receive parameter 2) has relatively large attenuation. If interference impact caused by signal transmission on the transmit beam 2 is not considered, it is clear that the transmit beam 1 and the receive beam 1 are a better combination, and the UE 1 needs to feed back an identifier of the transmit beam 1 to the access node 100. However, when the UE 1 uses the receive beam 1, the UE 1 is interfered with by a signal on the transmit beam 2. If the interference caused by the transmit beam 2 is relatively large, the UE 1 should not select the transmit beam 1 as a serving beam and feed back the identifier of the transmit beam 1.

Optionally, the interference-related indication information may be carried in configuration information sent by the access node to the UE. Optionally, the interference-related indication information may be sent by using a radio resource control (Radio Resource Control, RRC for short) message and/or downlink control information (Downlink Control Information, DCI for short), or may be sent to a terminal device by including the interference-related indication information in a MAC CE.

Optionally, the interference-related indication information may be indicated in an explicit indication manner or an implicit indication manner. An example in which the configuration information carries the interference-related indication information is used below for description. It should be understood that this application is not limited to this example. It should be noted that, to clarify an association relationship of the configuration information, the following descriptions start from an access phase, and other steps before this step that are not necessary for resolving the technical problem in this application are included:

In an initial access process, the access node and the UE reach preliminary beam alignment for the first time, and then the UE can access a network. In this case, a synchronization signal block (SS/PBCH block, SSB for short) is used as an example. For the access node and the UE, beam-related information depends on an initially accessed SSB, to be specific, the UE may maintain the following relationship in this case.

| SSB index #0 | Receive beam #0 |
| --- | --- |

In NR, a beam indication for a corresponding beam sent through a beam or a reference signal that is used on a downlink channel is implemented by associating the beam indication with a reference resource index in a transmission configuration indicator (Transmission Configuration Indicator, TCI for short) state table. For example, a base station configures a TCI state table (corresponding to TCI-states in 38.331) by using RRC higher layer signaling. A TCI is a beam indication method. For example, a structure of the TCI is as follows:

```
TCI-State ::=           SEQUENCE {
  tci-StateId             TCI-StateId,
  qcl-Type1               QCL-Info,
  qcl-Type2               QCL-Info
  ...
}
QCL-Info ::=            SEQUENCE {
  cell                    ServCellIndex
  bwp-Id                  BWP-Id
  referenceSignal         CHOICE {
    csi-rs                  NZP-CSI-RS-ResourceId,
    ssb                     SSB-Index,
    csi-RS-for-tracking     NZP-CSI-RS-ResourceSetId
  },
  qcl-Type                ENUMERATED {typeA, typeB, typeC, typeD},
  ...
}
```

The TCI may include a plurality of parameters, for example, a cell number, a BWP ID, a reference signal ID, a synchronization signal block ID, and a QCL type. A terminal may determine a receiving method as indicated by the TCI. For example, a beam indication of a control channel is a TCI state, the terminal may receive the control channel by using a QCL assumption corresponding to a QCL type in the TCI state used for receiving a reference signal or a synchronization signal block corresponding to a reference signal ID or a synchronization signal block ID in the TCI state.

Correspondingly, the access node may use the SSB index #0 as a reference of a beam direction, and configure the information as the TCI and notify the UE of the TCI.

| TCI #0 | SSB index #0 |
| --- | --- |

After the configuration information is received, a correspondence maintained on a UE side is as follows:

| TCI #0 | SSB index #0 | Receive beam #0 |
| --- | --- | --- |

Next, a CSI-RS is used as an example. The access node may configure a CSI-RS resource for the UE for further beam management. To achieve accurate beam alignment, the access node and the UE side may separately sweep their transmit beams and receive beams. When configuring the CSI-RS resource (resource), the access node may indicate a beam direction of the CSI-RS resource, so that receiving of the CSI-RS resource performed by the UE is facilitated. For example, the access node configures a CSI-RS resource #x and a CSI-RS resource #y, and indicates the UE to perform receive beam sweeping. It should be noted that in this specification, a resource index is configured to indicate/ represent a corresponding CSI-RS. In the following, a CSI-RS resource # is used to represent a corresponding CSI-RS, and the CSI-RS is not described separately again.

| CSI-RS resource #x | TCI #0 |
|---|---|
| CSI-RS resource #y | TCI #0 |
| Measurement manner | Receive beam sweeping |

After receiving the foregoing configuration, the UE may adjust a parameter of a receive antenna. For example, the UE further determines, based on a receive beam #0 corresponding to the TCI #0, to use a receive beam #1 and a receive beam #2 to measure a CSI-RS resource #1 and a CSI-RS resource #2. In this way, the following association relationships are obtained.

| CSI-RS resource #x | Receive beam #1 |
|---|---|
| CSI-RS resource #y | Receive beam #2 |

It should be noted that receive beam sweeping or transmit beam sweeping is controlled by using a value ON/OFF of a repetition field in NR. To avoid introducing too many concepts, only words are used for description herein.

Then, the TCI state may be reconfigured on an access node side. The SSB index #0, the CSI-RS resource #x, and the CSI-RS resource #y are all signals that have been transmitted/measured.

| TCI #0 | SSB index #0 |
|---|---|
| TCI #1 | CSI-RS resource #x |
| TCI #2 | CSI-RS resource #y |

After receiving the configuration, the UE side obtains the following association relationships:

| TCI #0 | SSB index #0 | Receive beam #0 |
|---|---|---|
| TCI #1 | CSI-RS resource #x | Receive beam #1 |
| TCI #2 | CSI-RS resource #y | Receive beam #2 |

Based on the configuration of the sent interference-related indication information in this embodiment, measurement with knowable interference is performed, and the access node side may reconfigure a beam management resource. For example, the interference-related indication information is indicated in an implicit indication manner. An optional configuration is: beam management resources {the CSI-RS resource #1, the CSI-RS resource #2, and a CSI-RS resource #3}, and the following reference signal resource QCL indications:

| CSI-RS resource #1 | TCI #1 |
|---|---|
| CSI-RS resource #2 | |
| CSI-RS resource #3 | TCI #2 |

It may be specified that a resource that is in the beam management resource set and that has no QCL indication is interference. It can be learned that the CSI-RS resource #2 in this example is indicated interference.

Alternatively, in this embodiment, the interference-related indication information is indicated in an explicit indication manner. When measurement with knowable interference is performed, an optional configuration is: beam management resources {the CSI-RS resource #1, the CSI-RS resource #2, and a CSI-RS resource #3}, an explicit interference source indication {the CSI-RS resource #2}, and the following reference signal resource QCL indications:

| CSI-RS resource #1 | TCI #1 |
|---|---|
| CSI-RS resource #2 | TCI #1 and TCI #2 |
| CSI-RS resource #3 | TCI #2 |

It can be learned that in this example, the CSI-RS resource #2 is explicitly indicated as an interference source, and the UE is indicated to separately receive the CSI-RS resource #2 through the receive beam 1 for receiving the CSI-RS resource #1 and the receive beam 2 for receiving the CSI-RS resource #3, to measure the interference.

If one RS resource can correspond to only one TCI state, when the interference-related indication information is indicated in the explicit indication manner, and measurement with knowable interference is performed, an optional configuration is: beam management resources {the CSI-RS resource #1, the CSI-RS resource #2, the CSI-RS resource #3, and a CSI-RS resource #4}; an explicit interference source indication {the CSI-RS resource #2 and the CSI-RS resource #4}, where both the CSI-RS resource #2 and the CSI-RS resource #4 are beams (for example, the beam 2 in FIG. 3) corresponding to the interference; and the following reference signal resource QCL indications:

| CSI-RS resource #1 | TCI #1 |
|---|---|
| CSI-RS resource #2 | TCI #1 |
| CSI-RS resource #3 | TCI #2 |
| CSI-RS resource #4 | TCI #2 |

Optionally, another configuration manner is as follows:

| Beam quality measurement | Interference beam measurement | QCL indication |
|---|---|---|
| CSI-RS resource #1 | CSI-RS resource #2 | TCI #1 |
| CSI-RS resource #3 | CSI-RS resource #2 | TCI #2 |

It may be understood that the foregoing several configuration manners are intended to notify the UE that the CSI-RS resource #2 (in some cases, the CSI-RS resource #4 is further included) is interference, and the UE needs to consider impact of the interference during further beam selection. It should be noted that the foregoing configurations are merely examples. In this application, an indication for the interference is not limited to the foregoing examples, and the interference-related indication information may be used to indicate a transmission resource for a downlink signal sent through a beam corresponding to the interference, and/or a receive beam for receiving a downlink signal sent through a beam corresponding to the interference. Optionally, the indication information may not only indicate the terminal device to separately receive, through all receive beams for receiving downlink signals corresponding to non-interference, downlink signals corresponding to the interference. Optionally, the interference-related indication information may alternatively indicate the terminal device to separately receive, through some receive beams for receiving downlink signals corresponding to non-interference, downlink signals corresponding to the interference. Further, optionally, the interference-related indication information may alternatively indicate the terminal device to receive, through a receive beam for receiving a downlink signal corresponding to non-interference, a downlink signal corresponding to the interference. In this way, the terminal device receives, through the receive beam for receiving the downlink signal corresponding to the non-interference, the downlink signal corresponding to the interference, so that the terminal device can obtain an amount of interference caused by the downlink signal corresponding to the interference to another downlink signal corresponding to the non-interference. Optionally, for the downlink signal corresponding to the indicated interference, the terminal device may alternatively receive, by default, the downlink signal through the receive beam for receiving the downlink signal corresponding to the non-interference, without an indication of the access node.

S102: The access node sends a downlink signal through two or more beams, where the two or more beams include the beam corresponding to the interference.

Based on the related configuration described above, after performing the configuration, the access node sends the downlink signal to perform interference measurement-based beam training. The downlink signal includes but is not limited to a primary synchronization signal (Primary Synchronization Signal, PSS for short)/secondary synchronization signal (Secondary Synchronization Signal, SSS for short), a downlink control channel demodulation reference signal PDCCH-DMRS, a downlink data channel demodulation reference signal PDSCH-DMRS, a phase noise tracking signal PTRS, a channel state information reference signal (Channel status information reference signal, CSI-RS), a cell signal (Cell Reference Signal, CRS for short) (which does not exist in NR), a fine synchronization signal (Time/frequency tracking Reference Signal, TRS for short) (which does not exist in LTE), and the like. Optionally, a downlink physical channel may further be included, and the downlink physical channel includes a broadcast channel (Physical broadcast channel, PBCH for short), a downlink control channel (Physical downlink control channel, PDCCH for short), a downlink data channel (Physical downlink shared channel, PDSCH for short), and the like.

S103. The UE measures the received downlink signal, and selects a beam.

The UE receives the downlink signal based on the configuration performed by the access node. The foregoing example is used for description. The UE receives the CSI-RS resource #1 through the receive beam 1, and receives the CSI-RS resource #3 through the receive beam 2. In addition, the UE further receives, based on the interference-related indication information, a downlink signal sent through the beam corresponding to the interference. To measure the interference, impact caused by the interference on different receive beams (or receive parameters) is considered, and the UE separately receives the CSI-RS resource #2 (including the CSI-RS resource #4 in some cases) corresponding to the interference through the receive beam 1 and the receive beam 2. Optionally, the UE may perform pairing and selection on a transmit beam and a receive beam by comparing a ratio RSRP #1-1/RSRP #1-2 of a reference signal received power (Reference Signal Received Power, RSRP for short) RSRP #1-1 of the CSI-RS resource #1 to a reference signal received power RSRP #1-2 of the CSI-RS resource #2 on the receive beam 1 with a ratio RSRP #2-3/RSRP #2-2 of a reference signal received power RSRP #2-3 of the CSI-RS resource #3 to a reference signal received power RSRP #2-2 of the CSI-RS resource #2 on the receive beam 2. For example, if RSRP #1-1/RSRP #1-2<RSRP #2-3/RSRP #2-2, the receive beam 2 (or the receive parameter 2) is a better receive beam, and a transmit beam corresponding to the CSI-RS resource #3 may be used as a serving beam selected by the UE. Optionally, reference signal received quality (reference signal received quality, RSRQ for short), a signal to interference plus noise ratio (signal to interference plus noise ratio, or SINR), or the like that is calculated by using the CSI-RS resource #2 as interference may alternatively be used as an indicator for beam quality comparison.

S104: The UE feeds back, to the access node, information related to the selected beam.

After selecting the beam, the UE may report, by using at least one of the following information, the selected transmit beam used as the serving beam: a resource index (CSI-RS resource index, CRI for short) of a downlink reference signal sent through a corresponding beam, for example, {CRI #1}; a received power (for example, the RSRP #1-1) for the downlink signal; an interference amount, where optionally, the interference amount may be a ratio, for example, the RSRP #1-1/the RSRP #1-2, of the received power (for example, the RSRP #1-1) for the downlink signal to a received power (for example, the RSRP #1-2) for the downlink signal corresponding to the interference; and the received power (for example, the RSRP #1-2) for the downlink signal corresponding to the interference. Optionally, an indicator such as RSRQ or an SINR may alternatively be used. The related information is reported, so that the access node learns of the beam selected by the UE. Optionally, the access node may further learn of information such as the received power and the interference amount. This provides a better reference for further configuration performed by the access node.

According to the beam training method in this embodiment of this application, the beam is selected in consideration of the interference factor in the beam training, so that the effective on-demand beam training can be implemented.

Embodiment 2

Figure 4:
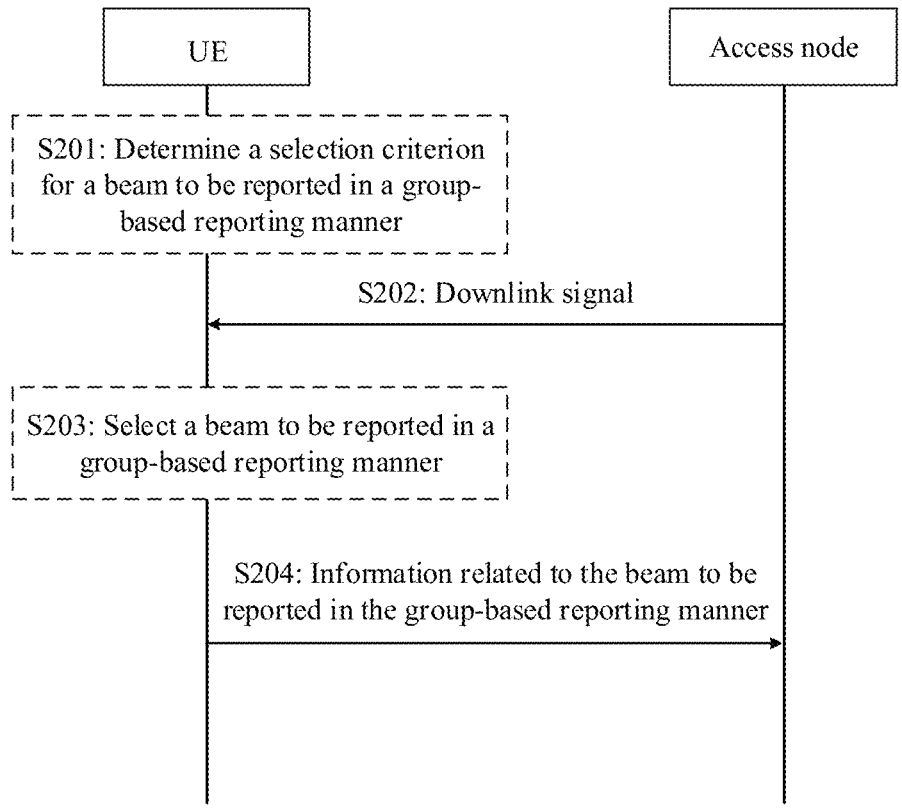
FIG. 4 is a flowchart of an embodiment of another beam training method according to this application.

FIG. 4 is a flowchart of an embodiment of another beam training method according to this application. A difference between this embodiment and Embodiment 1 lies in that, on-demand beam training in this embodiment is for reporting of a plurality of beam combinations, for example, group-based reporting. In consideration of a factor (for example, interference) that may affect a group-based reporting result, a beam to be reported in a group-based reporting manner is selected by using a specific beam selection criterion, to implement beam training. For ease of understanding of the solution, behavior on both a UE side and an access node side is described in this embodiment, and is described as a whole from perspectives of all the interaction sides. However, it is not limited to a case in which an improvement in a system is that steps on all the interaction sides need to be performed together. The technical solution provided in this application has improvements on all the sides in the system.

The method includes the following steps.

S201: UE determines a selection criterion for a beam to be reported in a group-based reporting manner.

During beam training, a network side sends a downlink signal to the UE through a transmit beam, the UE receives the downlink signal through a receive beam (corresponding to a receive parameter), and the UE measures the downlink signal and selects a serving beam. In this embodiment, beam selection is for a case of group-based reporting, that is, the selected transmit beam on the network side satisfies "simultaneously reception" performed by the UE in some sense. For example, if the network side sends a CSI-RS #1 through a transmit beam beam 1, sends a CSI-RS #2 through a transmit beam beam 2, and sends a CSI-RS #3 through a transmit beam beam 3, and the UE can receive the CSI-RS #1 and the CSI-RS #3 on a corresponding CSI-RS resource #1 and a corresponding CSI-RS resource #3 through a receive beam of the UE, it may be assumed that if the UE simultaneously uses both the CSI-RS resource #1 and the CSI-RS resource #3, the UE can simultaneously receive both the CSI-RS #1 and the CSI-RS #3. Therefore, during beam selection, the UE reports the beam 1 and the beam 3 as a group (where specifically, during implementation, the UE may select and report the beam 1 and the beam 3 by reporting the CSI-RS resource #1 and the CSI-RS resource #3 as a group).

In the foregoing example, for "simultaneous reception", there may be specific cases. In one case, the UE receives the CSI-RS #1 and the CSI-RS #3 on the corresponding CSI-RS resource #1 and the corresponding CSI-RS resource #3 through a same receive beam (by using a same receive parameter). In the other case, the UE receives the CSI-RS #1 and the CSI-RS #3 on the corresponding CSI-RS resource #1 and the corresponding CSI-RS resource #3 through different receive beams (by using different receive parameters). Therefore, the selection criterion is that downlink signals sent through a selected beam to be reported in a group-based reporting manner are received by the UE by using a same receive parameter, or downlink signals sent through a selected beam to be reported in a group-based reporting manner are received by the UE by using different receive parameters.

Optionally, for the case of group-based reporting in the beam training, the selection criterion for the beam to be reported in the group-based reporting manner may be configured by the network side (for example, an access node or a TRP) for the UE. Optionally, the selection criterion may be carried in configuration information sent to the UE, may be sent by using a radio resource control (Radio Resource Control, RRC for short) message and/or downlink control information (Downlink Control Information, DCI for short), or may be sent to a terminal device by adding the selection criterion to a MAC CE. Further, optionally, for the group-based reporting, the network side may configure group information, or a group configuration may be agreed on in a unified manner. If the group information is configured by the network side, the network side sends, to the UE, configuration information (which may be configured by using an RRC message, DCI, and a MAC CE in a manner similar to the foregoing selection criterion configuration) for a quantity of groups and/or a quantity of beams in each group in the group-based reporting. Optionally, the selection criterion for the beam to be reported in the group-based reporting manner may alternatively be determined by the UE based on an actual situation or based on a capability of the UE. If the selection criterion is determined by the network side, the network side knows the selection criterion according to which a beam to be reported in a group-based reporting manner is selected. In this case, the network side can have more reference information during beam scheduling. If the selection criterion is determined by the UE, the UE needs to send information about the selection criterion to the network side. Optionally, the UE may notify the network side of a supported selection criterion before the group-based reporting, or may notify the network side of a selection criterion for a beam to be reported in a group-based reporting manner during or after the group-based reporting, so that the network side can have more reference information during beam scheduling. For example, it is assumed that "simultaneous reception" (assuming that a beam 4 and a beam 5 are targeted) is implemented by UE 1 by using a same receive parameter in a scenario, and "simultaneous reception" (assuming that a beam 1 and a beam 3 are targeted) is implemented by the UE 1 by using different receive parameters in a scenario. If the beam 5 is still used by the access node to send a signal to UE 2, the access node cannot use the beam 4 to send a signal to the UE 1 during scheduling, because the signal sent by the access node to the UE 2 through the beam 5 causes strong interference to receiving performed by the UE 1. In another scenario, the access node may send a signal to the UE 1 through the beam 1, and send a signal to the UE 2 through the beam 3. Therefore, if the UE does not define the selection criterion for the beam to be reported in the group-based reporting manner for "simultaneously reception", a problem occurs when the access node performs scheduling.

S202: The access node sends a downlink signal to the UE through two or more beams.

During the beam training, the access node sends the downlink signal to the UE through two or more beams, so that the UE can measure the downlink signal, to implement the beam training. Optionally, the downlink signal includes but is not limited to a primary synchronization signal (Primary Synchronization Signal, PSS for short)/secondary synchronization signal (Secondary Synchronization Signal, SSS for short), a downlink control channel demodulation reference signal PDCCH-DMRS, a downlink data channel demodulation reference signal PDSCH-DMRS, a phase noise tracking signal PTRS, a channel state information reference signal (Channel status information reference signal, CSI-RS for short), a cell signal (Cell Reference Signal, CRS for short) (which does not exist in NR), a fine synchronization signal (Time/frequency tracking Reference Signal, TRS for short) (which does not exist in LTE), and the like.

It should be noted that there is no necessary sequence between step S201 and step S202, and flexible configuration may be performed according to different solutions.

S203: The UE selects, according to a downlink signal reception and selection criterion, a beam to be reported in a group-based reporting manner.

By receiving the downlink signal, the UE selects the beam to be reported in the group-based reporting manner from the beams. Optionally, the terminal device measures a received power RSRP for the downlink signal, and determines, based on a measurement result and the selection criterion, the beam to be reported in the group-based reporting manner. Optionally, the terminal device may alternatively measure an indicator such as RSRQ or an SINR of the downlink signal. It may be understood that during the beam selection, the terminal device needs to consider signal quality in addition to the selection criterion for the beam to be reported in the group-based reporting manner.

If the selection criterion is notified by the network side to the UE, when the network side notifies the UE to group beams on which reception can be simultaneously performed by using a same receive parameter into one group, the UE should be able to group the beams on which reception can be simultaneously performed by using the same receive parameter into one group, and compare beam quality of each group. When the network side indicates the UE to group beams on which reception needs to be simultaneously performed by using different receive parameters into one group, the UE needs to group the beams on which reception needs to be simultaneously performed by using the different receive parameters into one group, and compare beam quality of each group. Beam quality of one group of beams may be an average value of quality of a plurality of beams in the group, or a capacity of a multi-antenna channel including the plurality of beams in the group, or stability of a link including the plurality of beams, or the like.

If the selection criterion is determined by the UE, the UE may determine, based on an indicator such as the capability of the UE, beam quality, a channel capacity, or robustness, a grouping method most suitable for the UE, and group beams on which reception can be simultaneously performed by using a same receive parameter into one group or group beams on which reception needs to be simultaneously performed by using different receive parameters into one group.

S204: The UE sends, to the access node, information related to the selected beam to be reported in the group-based reporting manner.

That the UE sends, to the access node, the information related to the selected beam to be reported in the group-based reporting manner is the group-based reporting. Optionally, the related information includes at least one of the following: a resource index (CSI-RS resource index, CRI for short) for the downlink signal corresponding to the beam to be reported in the group-based reporting manner, a received power for the downlink signal corresponding to the beam to be reported in the group-based reporting manner, an interference amount (which may be a ratio of received powers), and a group identifier. The foregoing example is used, and the related information may be {a CRI #1, a CRI #3, an RSRP #1, an RSRP #3, and the RSRP #1/the RSRP #3}.

In addition, if the selection criterion is determined by the UE, the UE may send, to the network side during the group-based reporting, the selection criterion for the beam to be reported in the group-based reporting manner. Optionally, the selection criterion may be indicated by using a bitmap or a value of a corresponding field. Optionally, the UE may add information to each group-based reporting to describe a grouping method. For example, a bit "0" indicates that reception on beams in the group can be simultaneously performed by using a same receive parameter, and a bit "1" indicates that reception on beams in the group can be simultaneously performed by using different receive parameters.

According to the beam training method in this embodiment of this application, during the beam training, the beam is selected in consideration of the specific selection criterion for a beam to be reported in a group-based reporting manner, to avoid a problem occurring when the access node performs scheduling because "simultaneously reception" may be implemented by the UE in different manners. Therefore, the method in this embodiment of this application can implement effective on-demand beam training.

Embodiment 3

Figure 5:
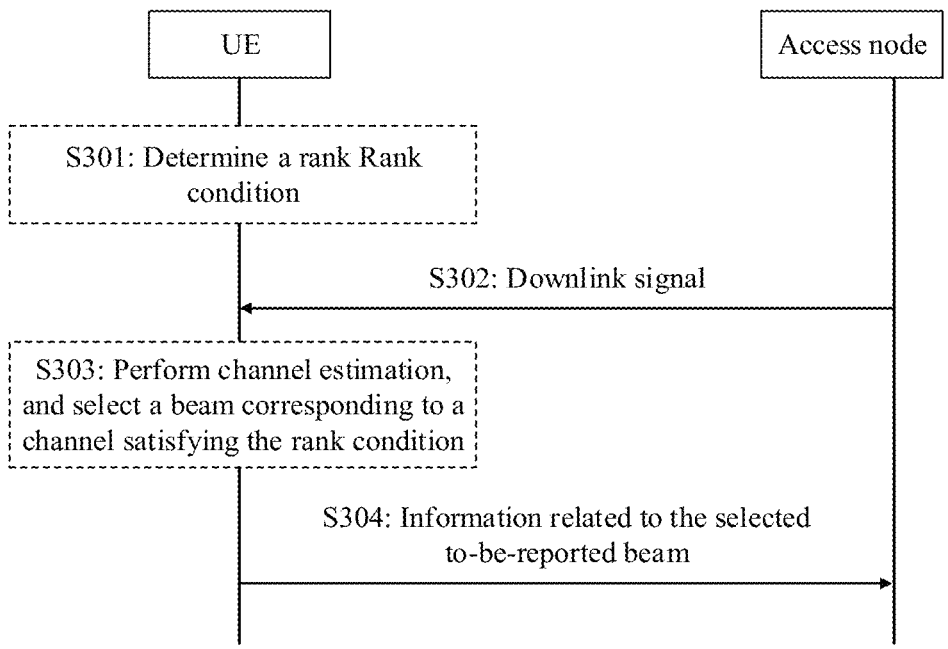
FIG. 5 is a flowchart of an embodiment of still another beam training method according to this application.

FIG. 5 is a flowchart of an embodiment of still another beam training method according to this application. A difference between this embodiment and both Embodiment 1 and Embodiment 2 lies in that, a transport stream factor is considered in on-demand beam training in this embodiment.

For ease of understanding of the solution, behavior on both a UE side and an access node side is described in this embodiment, and is described as a whole from perspectives of all the interaction sides. However, it is not limited to a case in which an improvement in a system is that steps on all the interaction sides need to be performed together. The technical solution provided in this application has improvements on all the sides in the system.

The method includes the following steps.

S301: UE determines a rank (Rank) condition.

A rank (Rank) of a MIMO channel matrix reflects a maximum quantity of transport streams that can be supported by a current channel. In beam-based communication, ranks of MIMO channels including different beams or beam combinations are different. When a network side transmits data to the UE, multi-stream transmission can be used to effectively improve spectrum efficiency. In actual transmission, the network side needs to serve a plurality of UEs, and a quantity of transport streams allocated to each UE is determined by using a scheduling algorithm. Therefore, the UE needs to select a beam or a beam combination that can support the quantity of streams to form a MIMO channel for multi-stream data transmission. When receiving a downlink signal, the UE may perform channel estimation based on the downlink signal. During beam training, the UE may perform beam pairing and selection based on a requirement on a quantity of channel transport streams. Optionally, the rank condition may be configured by the network side and sent to the UE, and information about the rank condition may be sent by using at least one of an RRC message, DCI, and a MAC CE. Optionally, the rank condition includes at least one of the following: a rank value indication, for example, a rank 2 or a rank 4; an MCS (modulation and coding scheme, modulation and coding scheme) requirement or an SINR requirement, where for example, channel quality corresponding to each rank of a MIMO channel including beams selected by the UE needs to support a specific signal modulation scheme and/or coding scheme, or needs to be greater than a specific SINR, and optionally, the SINR requirement may alternatively be embodied as a CQI (channel quality indicator) indicator; and a minimum MCS requirement or a minimum SINR requirement of each flow. Optionally, the rank condition may further include a codebook indication. Optionally, the rank condition may further include a beam indication. For example, the network side may indicate the UE to select a beam paired with a transmit beam to form a multi-beam MIMO channel. Optionally, the rank condition may be autonomously selected by the UE. During the beam training, the UE may notify the network side of the selected rank condition, so that the network side has sufficient information, and no scheduling error is caused.

S302: An access node sends a downlink signal to the UE through one or more beams.

Optionally, the downlink signal includes but is not limited to a primary synchronization signal (Primary Synchronization Signal, PSS for short)/secondary synchronization signal (Secondary Synchronization Signal, SSS for short), a downlink control channel demodulation reference signal PDCCH-DMRS, a downlink data channel demodulation reference signal PDSCH-DMRS, a phase noise tracking signal PTRS, a channel state information reference signal (Channel status information reference signal, CSI-RS for short), a cell signal (Cell Reference Signal, CRS for short) (which does not exist in NR), a fine synchronization signal (Time/frequency tracking Reference Signal, TRS for short) (which does not exist in LTE), and the like.

It should be noted that there is no necessary sequence between step S301 and step S302, and flexible configuration may be performed according to different solutions.

S303: The UE performs channel estimation based on the downlink signal, and selects a transmit beam for a downlink signal corresponding to a channel satisfying the rank condition.

The UE performs beam pairing based on receiving of the downlink signal, and determines, based on a channel matrix, one or more beams satisfying the rank condition. Specifically, the one or more beams satisfying the rank condition may be understood as one or more beams that can form a channel on which a quantity of ranks is greater than or equal to a quantity of ranks in the rank condition.

S304: The UE sends, to the access node, information related to the selected to-be-reported beam in the beams.

Optionally, the UE may send, to the access node in a group-based reporting manner, the related information of the selected to-be-reported beam in the beams. Time-frequency resources that need to be reserved by the terminal device can be reduced in the group-based reporting manner, thereby greatly improving resource utilization. Optionally, the related information includes: a resource index for the downlink signal sent through the corresponding beam, or a received power for the downlink signal, or an interference amount. For details, refer to related descriptions in Embodiment 1 and Embodiment 2. Details are not described herein again. The related information is reported, so that the access node learns of the beam selected by the UE. Optionally, the access node may further learn of information such as the received power and the interference amount. This provides a better reference for further configuration performed by the access node.

In addition, if the rank condition is autonomously selected by the UE, the UE may further notify the access node of the rank condition during beam reporting.

It may be understood that, if no corresponding channel determined by the UE based on the downlink signal in S303 satisfies the rank condition, the UE sends abnormality indication information to the access node.

According to the beam training method in this embodiment of this application, the beam is selected in consideration of the transport stream factor in the beam training, so that effective on-demand beam training can be implemented.

Embodiment 2 and Embodiment 3 respectively provide beam selection in consideration of the selection criterion (interference is considered) and beam selection in consideration of the quantity of transport streams. Optionally, there may be more other factors for performing beam selection and beam grouping with reference to or in place of the factors considered in Embodiment 2 or Embodiment 3, for example, maximizing a capacity (capacity), minimizing intra-group interference, minimizing inter-group interference, maximizing intra-group beam correlation, minimizing intra-group beam correlation, maximizing inter-group beam correlation, minimizing inter-group beam correlation, satisfying a specified condition (for example, a capacity) and minimizing power consumption, satisfying a specified condition (such as a capacity) and minimizing a quantity of radio frequency links enabled by the UE, satisfying a specified condition (for example, a capacity) and minimizing a quantity of antenna panels enabled by the UE, or optimizing a robustness indicator (for example, a block error rate (block error rate, BLER for short)) is considered. The capacity is a rate at which information can be transmitted on a channel. Maximizing the capacity is maximizing a transmission rate that can be supported by a beam or a beam combination selected by the UE. The UE may calculate a channel capacity by measuring channels including different beams or beam combinations.

The technical solution of downlink beam training is described in the foregoing embodiments, and a technical solution of uplink beam training is described in the following embodiment.

Embodiment 4

Figure 6:
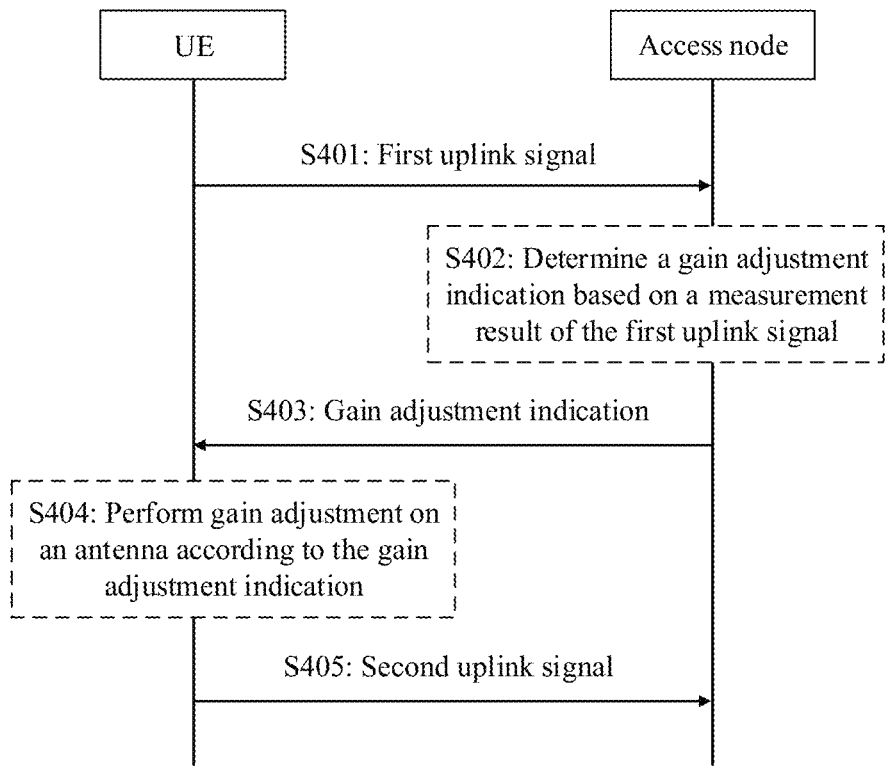
FIG. 6 is a flowchart of an embodiment of yet another beam training method according to this application.

FIG. 6 is a flowchart of an embodiment of yet another beam training method according to this application. Behavior on both a UE side and an access node side is described in this embodiment, and is described as a whole from perspectives of all the interaction sides. However, it is not limited to a case in which an improvement in a system is that steps on all the interaction sides need to be performed together. The technical solution provided in this application has improvements on all the sides in the system.

The method includes the following steps.

S401: UE sends a first uplink signal to an access node.

Optionally, the uplink signal includes but is not limited to a channel sounding signal (Sounding Reference Signal, SRS for short), an uplink control channel demodulation reference signal (PUCCH De-modulation Reference Signal, PUCCH-DMRS for short), an uplink data channel demodulation reference signal PUSCH-DMRS, an uplink phase noise tracking signal (phase noise tracking reference signal, PTRS for short), and the like.

S402: The access node determines a gain adjustment indication based on a measurement result of the first uplink signal.

In different scenarios, requirements for uplink beams of the UE are different. For example, the UE needs to be explicitly indicated to use a narrower beam for communication.

In a downlink communication link, a power of a signal received by the UE may be briefly expressed as follows:

$$P_{UE}^{Rx} = P_{BS}^{Tx} + G_{BS}^{Tx} - PL_{DL}^{pure} + G_{UE}^{Rx} \quad \text{(Formula 1)}$$

$P_{UE}^{Rx}$ is the power of the signal received by the UE, $P_{BS}^{Tx}$ is a power at which the access node sends a signal, $G_{BS}^{Tx}$ is a transmit antenna gain of the access node, $PL_{DL}^{pure}$ is signal strength attenuation caused by a downlink transmission path, and $G_{UE}^{Rx}$ is a receive antenna gain of the UE.

On the contrary, in an uplink, a power of a signal received by the access node may be briefly expressed as follows:

$$P_{BS}^{Rx} = P_{UE}^{Tx} + G_{UE}^{Tx} - PL_{UL}^{pure} + G_{BS}^{Rx} \quad \text{(Formula 2)}$$

$P_{BS}^{Rx}$ is the power of the signal received by the access node, $P_{UE}^{Tx}$ is a power at which the UE sends a signal, $G_{UE}^{Tx}$ is a transmit antenna gain of the UE, $PL_{UL}^{pure}$ is signal strength attenuation caused by a transmission path, and $G_{BS}^{Rx}$ is a receive antenna gain of the access node. To be brief, it may be assumed that $PL_{DL}^{pure} = PL_{UL}^{pure}$, to be specific, the signal strength attenuation caused by the uplink transmission path is the same as that caused by the downlink transmission path.

In addition, when sending an uplink signal, for example, an SRS, the UE needs to determine a power used for sending the uplink signal. A basic uplink transmit power control principle is estimating a path loss and inferring strength of a signal arriving at a receive end. The following is an SRS power control method.

$$P_{UE}^{Tx} = P_0 + \alpha * PL_{DL}^{AGG} + \text{others} \quad \text{(Formula 3)}$$

$P_{UE}^{Tx}$ is a power at which the UE sends a signal, $P_0$ is a value specified by the access node, $\alpha$ is a scaling coefficient indicated by the access node, $PL_{DL}^{AGG}$ is a path loss estimated by the UE (where the access node may indicate a reference downlink signal for the path loss estimation), and others are some adjustment amounts including a bandwidth. In this application, "others" may be considered or may not be considered. For a further example, descriptions are provided below by using an example in which "others" is not considered temporarily.

The estimated path loss may be obtained in the following manner:

$$PL_{DL}^{AGG}=P_{BS}^{Tx}-P_{UE}^{Rx} \quad \text{(Formula 4)}$$

$P_{BS}^{Tx}$ is a signal transmit power notified by the access node, and $P_{UE}^{Rx}$ is signal strength actually measured by the UE, for example, may be measured by using an RSRP.

The following formula 5 is obtained by substituting the formula 1 into the formula 4. It can be learned that, the receive antenna gain $G_{UE}^{Rx}$, the transmit antenna gain $G_{BS}^{Tx}$, and the signal strength attenuation $PL_{DL}^{pure}$ caused by the downlink transmission path are considered in the path loss estimation.

$$PL_{DL}^{AGG}=PL_{DL}^{pure}-G_{BS}^{Tx}-G_{UE}^{Rx} \quad \text{(Formula 5)}$$

The formula (5) and the formula (3) are substituted into the formula (2), and "others" is not considered temporarily, so that the following is obtained:

$$P_{BS}^{Rx}=P_0+\alpha*(PL_{DL}^{pure}-G_{BS}^{Tx}-G_{UE}^{Rx})+G_{UE}^{Tx}-PL_{UL}^{pure}+G_{BS}^{Rx} \quad \text{(Formula 6)}$$

If $\alpha=1$, the formula is simplified as:

$$P_{BS}^{Rx}=P_0+(G_{UE}^{Tx}-G_{UE}^{Rx})+(G_{BS}^{Rx}-G_{BS}^{Tx}) \quad \text{(Formula 7)}$$

It can be learned that, to improve $P_{BS}^{Rx}$ without changing $P_{UE}^{Tx}$ (that is, enhance uplink coverage without increasing the transmit power), an optional method is increasing $G_{UE}^{Tx}$ and/or increasing $G_{Bs}^{Rx}$ (that is, using a UE transmit beam or an access node receive beam having a higher gain).

In this embodiment, gain adjustment on the UE side is used for description. Therefore, the access node determines the UE gain adjustment indication based on the measurement result of the first uplink signal.

S403: The access node sends the gain adjustment indication to the UE.

In a possible design, an indication manner of the gain adjustment includes an explicit indication manner or an implicit indication manner. To perform the on-demand beam training in consideration of a gain adjustment factor, a network device may send the gain adjustment indication to the UE in the explicit indication manner or the implicit indication manner.

In a possible design, the explicit indication manner includes: sending indication information for a target antenna gain, for example, indicating to send an uplink signal by using a transmit antenna gain of 17 dBi; or sending indication information for an antenna gain adjustment factor, that is, the indication information indicates how much dB is added to a current antenna gain, for example, antenna gain+5 dB. An operation of the UE can be simplified in the explicit indication manner.

In a possible design, the implicit indication method includes: sending a calculation parameter used by the UE to determine a transmit power, where the calculation parameter is used to enable the transmit power determined by the UE to exceed a preset transmit power threshold. In other words, in the implicit indication manner, the UE determines the transmit power that exceeds the threshold, so that the UE increases a transmit antenna gain to avoid exceeding the threshold, thereby adjusting the gain. The calculation parameter includes at least one of the following: a value $P_0$ specified by a network side, a scaling coefficient $\alpha$ indicated by the network side, and a path loss estimation reference. Alternatively, optionally, the implicit indication method includes: sending a first calculation parameter and a second calculation parameter that are used by the UE to determine a transmit power, where the first calculation parameter includes a value $P_{0\_1}$ specified by the network device, and the second calculation parameter includes a value $P_{0\_2}$ specified by the network device. For example, $P_{0\_1}$ is the same as the existing $P_0$, and a transmit antenna gain adjustment amount is implicitly notified by using a difference between $P_{0\_2}$ and $P_{0\_1}$, that is, a difference between the first calculation parameter and the second calculation parameter is the antenna gain adjustment amount, that is, $P_{0\_2}-P_{0\_1}=\Delta G_{UE}^{Tx}$. Alternatively, optionally, the implicit indication method includes: sending a received power and a target received power at which the access node receives the first uplink signal, so that the UE adjusts the gain based on the target received power to achieve the target received power. For example, the access node feeds back that quality of the uplink signal received by the access node is −100 dBm, and require target quality of the terminal to reach −90 dBm. Signaling overheads can be reduced in the implicit indication manner.

In a possible design, the UE has a plurality of beam forms. For example, the UE has a plurality of low-gain wide beams and a plurality of high-gain narrow beams. Optionally, there is a correspondence between a wide beam and a narrow beam, and the correspondence is a one-to-one correspondence, a one-to-many correspondence, or a many-to-one correspondence. The UE may support the plurality of beam forms through capability reporting. A base station may indicate the UE to switch a beam form, to increase an antenna gain, thereby improving uplink transmission quality. For example, the base station may indicate the UE to perform uplink transmission or uplink beam training by using a wide beam #1, and indicate the UE to switch a beam form to a narrow beam. In this case, the UE needs to perform the uplink transmission or the uplink beam training by using a narrow beam corresponding to the wide beam #1.

Optionally, the gain adjustment indication may be carried in configuration information sent by the access node to the UE, may be sent by using an RRC message and/or DCI, or may be carried in a MAC CE and sent to the UE.

S404: The UE performs gain adjustment on an antenna according to the gain adjustment indication.

As indicated by the network side, the UE adjusts a gain of the antenna, to send a subsequent uplink signal through the antenna after the gain is adjusted.

S405: The UE sends a second uplink signal to the access node.

As an indicated/configured by the access node, the UE adjusts the gain of the antenna, and sends the second uplink signal to the access node after the gain is adjusted. That is, during uplink beam training is performed, the gain adjustment factor is considered. Optionally, during beam training, the UE may perform omnidirectional sweeping in space, or may perform narrow beam sweeping in a wide beam range as indicated by the network device. In this application, the UE sweeps a plurality of high-gain narrow beams in space, that is, sends uplink signals through different high-gain narrow beams. Optionally, before the sending a second uplink signal to the network device, the method further includes: receiving an indication for information that is related to a beam used by the UE to send the second uplink signal and that is sent by the network device, where the transmit beam indication includes at least one of the following: a resource index for sending the first uplink signal, beam-related information of random access in an access process, and an ID of a resource/an SSB of a corresponding reciprocity-based CSI-RS. The resource index for the first uplink signal and the beam-related information of the random access in the access process may be used to indicate a wide beam that has been used by the UE previously, to provide a specific reference for the UE, so that spatial sweeping of the UE can focus on a specific wide beam range.

According to the beam training method in this embodiment of this application, the beam is selected in consideration of the gain adjustment factor in the uplink beam training, so that the effective on-demand beam training can be implemented.

The foregoing embodiments mainly describes the solutions provided in the embodiments of this application from a perspective of interaction between entities in a system or a perspective of an internal implementation process of an entity. It may be understood that to implement the foregoing functions, the foregoing various entities include hardware structures and/or software modules corresponding to the various functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the UE and the access node according to the examples of the methods. For example, various function modules may be divided according to the corresponding functions, or two or more functions may be integrated into one processing module. The integrated module may be implemented in a form of hardware, or may be implemented in a form of a software function module. It should be noted that, in the embodiments of this application, the division into modules is an example, and is merely a logical function division. In an actual implementation, another division manner may be used. An example in which function modules are divided based on functions is used below for description.

Figure 7:
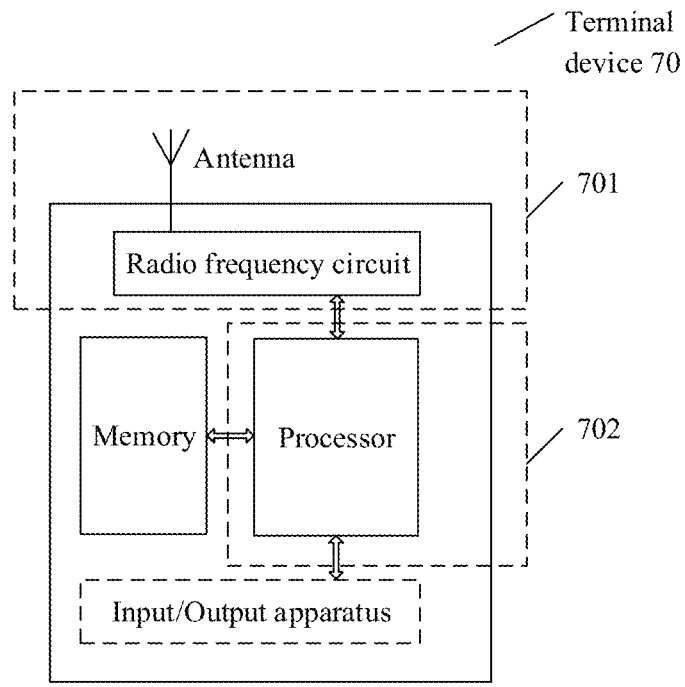
FIG. 7 is a simplified schematic structural diagram of a terminal device according to this application.

An embodiment of this application further provides a terminal device. The terminal device may be configured to perform the steps performed by the UE in any one of FIG. 2 and FIG. 4 to FIG. 6. FIG. 7 is a simplified schematic structural diagram of a terminal device. For ease of understanding and illustration, an example in which the terminal device is a mobile phone is used in FIG. 7. As shown in FIG. 7, the terminal device 70 includes a processor, a memory, a radio frequency circuit, an antenna, and an input/output apparatus. The processor is mainly configured to: process a communications protocol and communication data, control the terminal device 70, execute a software program, process data of the software program, and the like. The memory is mainly configured to store a software program and data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, such as a touchscreen, a display, or a keyboard, is mainly configured to receive data entered by a user and output data to the user. It should be noted that some types of terminal devices 70 may have no input/output apparatus. The memory and the processor may be integrated together or may be disposed independently. In addition, the radio frequency circuit and the processor may be integrated together or may be disposed independently.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal device 70, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 7 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have transmission and reception functions may be considered as a transceiver unit of the terminal device 70, and the processor that has a processing function may be considered as a processing unit of the terminal device 70. As shown in FIG. 7, the terminal device 70 includes a transceiver unit 701 and a processing unit 702. The transceiver unit may also be referred to as a transceiver (including a transmitter and/or a receiver), a transceiver machine, a transceiver apparatus, a transceiver circuit, or the like. The processing unit may also be referred to as a processor, a processing board, a processing module, a processing apparatus, or the like. Optionally, a component that is in the transceiver unit 701 and that is configured to implement a receiving function may be considered as a receiving unit, and a component that is in the transceiver unit 701 and that is configured to implement a sending function may be considered as a sending unit. In other words, the transceiver unit 701 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like. In some embodiments, the transceiver unit 701 and the processing unit 702 may be integrated together, or may be disposed independently. In addition, all functions of the processing unit 702 may be integrated into one chip for implementation. Alternatively, some functions may be integrated into one chip for implementation and some other functions are integrated into one or more other chips for implementation. This is not limited in this application. The term "unit" used in this specification may refer to an application-specific integrated circuit (ASIC), an electronic circuit, a processor (shared, dedicated, or group), a memory, or a combinational logic circuit that executes one or more software or firmware programs, and/or other suitable components that provide the function.

For example, in an implementation, the transceiver unit 701 may be configured to perform receiving and/or sending operations of the UE in S101, S102, and/or S104 in FIG. 2, and/or other steps in this application. The processing unit 702 may be configured to perform S103 in FIG. 2, and/or other steps in this application.

For example, in an implementation, the transceiver unit 701 may be configured to perform receiving and/or sending operations of the UE in S202 and/or S204 in FIG. 4, and/or other steps in this application. The processing unit 702 may be configured to perform S201 and/or S203 in FIG. 4, and/or other steps in this application.

For example, in an implementation, the transceiver unit 701 may be configured to perform receiving and/or sending operations of the UE in S302 and/or S304 in FIG. 5, and/or other steps in this application. The processing unit 702 may be configured to perform S301 and/or S303 in FIG. 5, and/or other steps in this application.

For example, in an implementation, the transceiver unit 701 may be configured to perform receiving and/or sending operations of the UE in S401, S403, and/or S405 in FIG. 6, and/or other steps in this application. The processing unit 702 may be configured to perform S404 in FIG. 6, and/or other steps in this application.

Figure 8:
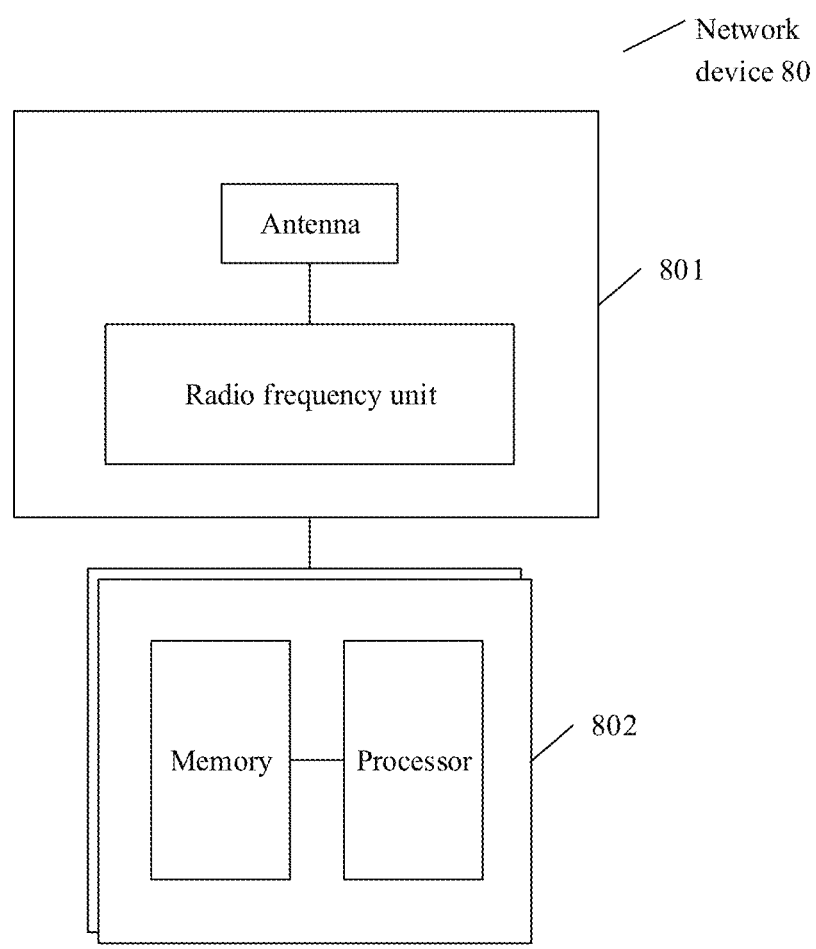
FIG. 8 is a simplified schematic structural diagram of a network device according to this application.

An embodiment of this application further provides a network device. The network device may serve as an access node or a transmission reception point, and is configured to perform the steps performed by the access node in any one of FIG. 2 and FIG. 3 to FIG. 6. FIG. 8 is a simplified schematic structural diagram of a network device. The network device 80 includes a part 801 and a part 802. The part 801 is mainly configured to send and receive a radio frequency signal and perform conversion between the radio frequency signal and a baseband signal. The part 802 is mainly configured to perform baseband processing, control the network device 80, and the like. The part 801 may be usually referred to as a transceiver unit, a transceiver machine, a transceiver circuit, a transceiver, or the like. The part 802 is usually a control center of the network device 80, and may usually be referred to as a processing unit, a control unit, a processor, a controller, or the like. The part 802 is configured to control the network device 80 to perform the steps performed by the access node/transmission reception point that is related to a measurement function entity on an access side or is used as a measurement function entity on an access side in the foregoing related embodiments. For details, refer to the foregoing descriptions of the related parts.

The transceiver unit in the part 801 may also be referred to as a transceiver machine, a transceiver, or the like. The transceiver unit includes an antenna and a radio frequency unit. The radio frequency unit is mainly configured to perform radio frequency processing. Optionally, a component that is in the part 801 and that is configured to implement a reception function may be considered as a receiving unit, and a component that is configured to implement a transmission function may be considered as a sending unit. In other words, the part 801 includes the receiving unit and the sending unit. The receiving unit may also be referred to as a receiver machine, a receiver, a receiver circuit, or the like. The sending unit may be referred to as a transmitter machine, a transmitter, a transmit circuit, or the like.

The part 802 may include one or more boards. Each board may include one or more processors and one or more memories, and the processor is configured to read and execute a program in the memory, to implement a baseband processing function and control the network device 80. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors. The memory and the processor may be integrated together, or may be disposed independently. In some embodiments, the part 801 and the part 802 may be integrated together, or may be disposed independently. In addition, all functions of the part 802 may be integrated into one chip for implementation. Alternatively, some functions may be integrated into one chip for implementation and some other functions are integrated into one or more other chips for implementation. This is not limited in this application.

For example, in an implementation, the transceiver unit may be configured to perform receiving and/or sending operations of the access node in S101, S102, and/or S104 in FIG. 2, and/or other steps in this application. The processing unit may be configured to perform operations such as determining interference-related indication information and determining a beam training result in the embodiment related to FIG. 2, and/or other steps in this application.

For example, in an implementation, the transceiver unit may be configured to perform receiving and/or sending operations of the access node in S202 and/or S204 in FIG. 4, and/or other steps in this application. The processing unit may be configured to perform operations such as determining a selection criterion and determining a beam training result in the embodiment related to FIG. 4, and/or other steps in this application.

For example, in an implementation, the transceiver unit may be configured to perform receiving and/or sending operations of the access node in S302 and/or S304 in FIG. 5, and/or other steps in this application. The processing unit may be configured to perform operations such as determining a rank (Rank) condition and determining a beam training result in the embodiment related to FIG. 5, and/or other steps in this application.

For example, in an implementation, the transceiver unit may be configured to perform receiving and/or sending operations of the access node in S401, S403, and/or S405 in FIG. 6, and/or other steps in this application. The processing unit may be configured to perform S402 in FIG. 6, and/or other steps in this application.

The foregoing provided terminal-side apparatus may be a terminal device, or may be a chip or a function module in a terminal device, and may implement the foregoing method by software or hardware, or by hardware executing corresponding software.

A specific implementation of the foregoing provided network-side apparatus may be an access node device. For example, the apparatus may be an access node device, or may be a chip or a function module in an access node device. The foregoing method may be implemented by software, hardware, or by hardware executing corresponding software.

For explanations and beneficial effects of related content of any terminal device, network device, and corresponding apparatus provided above, refer to the corresponding method embodiments provided above. Details are not described herein again.

This application further provides a beam training system, including the UE (or a UE side apparatus implementing the foregoing UE function) and the access node (or an access side apparatus or a transmission reception point implementing the foregoing access node function) in the foregoing implementations.

This application further provides a computer program product. When the computer program product is run on a computer, the computer is enabled to perform any method provided above.

This application further provides a chip. The chip stores an instruction, and when the instruction is run on the foregoing devices, the devices are enabled to perform the foregoing provided methods.

This application further provides a computer storage medium. The computer storage medium stores a computer program (an instruction). When the program (instruction) is run on a computer, the computer is enabled to perform the method according to any one of the foregoing aspects.

All or some of the foregoing embodiments may be implemented through software, hardware, firmware, or any combination thereof. When a software program is used to implement the embodiments, the embodiments may be implemented or partially in a form of a computer program product. The computer program product includes one or more computer instructions. When the computer program instructions are loaded and executed on a computer, the procedures or functions according to the embodiments of this application are all or partially generated. The computer may be a general purpose computer, a special purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor/controller or another unit may implement several functions enumerated in the claims. Some measures are recorded in dependent claims that are different from each other, but this does not mean that these measures cannot be combined to produce a better effect.

Although this application is described with reference to specific features and the embodiments thereof, definitely, various modifications and combinations may be made to them without departing from the scope of this application. Correspondingly, the specification and accompanying drawings are merely example descriptions of this application defined by the accompanying claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A beam training method, comprising:
   receiving, from a network device, interference information indicating using a receiving beam for receiving a downlink signal that does not cause interference to a terminal device and a downlink signal that causes interference to the terminal device;
   receiving, from the network device, one or more downlink signals that do not cause interference and one or more downlink signals that cause interference through corresponding receiving beams respectively indicated by the interference information; and
   transmitting, to the network device, information related to a beam selected from a plurality of beams based on the interference information and a measurement result obtained from measuring the one or more downlink signals that do not cause interference and the one or more downlink signal that cause interference, wherein the information related to the beam selected from the plurality of beams comprises a resource index of a downlink signal sent through the beam and an interference amount corresponding to the resource index, and wherein the interference amount is obtained from measuring the downlink signal that causes interference.

2. The method according to claim 1, wherein the interference information further indicates a transmission resource for an interfering beam that transmits the downlink signal that causes interference to the terminal device.

3. The method according to claim 1, wherein the downlink signal that does not cause interference is sent through a non-interfering beam in the plurality of beams that does not cause interference.

4. The method according to claim 1, wherein the interference information further indicates at least one of a transmission resource for the downlink signal that causes interference or a receiving beam corresponding to the transmission resource.

5. The method according to claim 1, wherein the interference amount comprises a signal to interference and noise ratio (SINR) information.

6. A beam training apparatus, comprising:
   at least one processor, and
   one or more memories coupled to the at least one processor and storing programming instructions for execution by the at least one processor, the programming instructions instruct the at least one processor to perform operations comprising:
   receiving, from a network device, interference information indicating using a receiving beam for receiving a downlink signal that does not cause interference to a terminal device and a downlink signal that causes interference to the terminal device;
   receiving, from the network device, one or more downlink signals that do not cause interference and one or more downlink signals that cause interference through corresponding receiving beams respectively indicated by the interference information; and
   transmitting, to the network device, information related to a beam selected from a plurality of beams based on the interference information and a measurement result obtained from measuring the one or more downlink signals that do not cause interference and the one or more downlink signal that cause interference, wherein the information related to the beam selected from the plurality of beams comprises a resource index of a downlink signal sent through the beam and an interference amount corresponding to the resource index, and wherein the interference amount is obtained from measuring the downlink signal that causes interference.

7. The apparatus according to claim 6, wherein the interference information further indicates a transmission resource for an interfering beam that transmits the downlink signal that causes interference to the terminal device.

8. The apparatus according to claim 6, wherein the interference information further indicates at least one of a transmission resource for the downlink signal that causes interference or a receiving beam corresponding to the transmission resource.

9. The apparatus according to claim 7, wherein the interference information further indicates at least one of a transmission resource for the interfering beam or a receiving beam corresponding to the transmission resource.

10. The apparatus according to claim 6, wherein the interference amount comprises a signal to interference and noise ratio (SINR) information.

11. The apparatus according to claim 6, wherein the apparatus is a terminal device, or a chip.

12. A beam training apparatus, comprising:
at least one processor, and
one or more memories coupled to the at least one processor and storing programming instructions for execution by the at least one processor, the programming instructions instruct the at least one processor to perform operations comprising:
transmitting, to a terminal device, interference information indicating using a receiving beam for receiving a downlink signal that does not cause interference and a downlink signal that causes interference;
transmitting, to the terminal device, one or more downlink signals that do not cause interference and one or more downlink signals that cause interference through transmitting beams corresponding to the receiving beams respectively indicated by the interference information; and
receiving information related to a beam selected from a plurality of beams based on the interference information and a measurement result obtained from measuring the one or more downlink signals that do not cause interference and the one or more downlink signals that cause interference, wherein the information related to the beam selected from the plurality of beams comprises a resource index of a downlink signal sent through the beam and an interference amount corresponding to the resource index, and wherein the interference amount is obtained from measuring the downlink signal that causes interference.

13. The apparatus according to claim 12, wherein the interference information further indicates a transmission resource for an interfering beam that transmits the downlink signal that causes interference to the terminal device.

14. The apparatus according to claim 12, wherein the downlink signal that does not cause interference is sent through a non-interfering beam in the plurality of beams that does not cause interference.

15. The apparatus according to claim 12, wherein the interference information further indicates at least one of a transmission resource for the downlink signal that causes interference or a receiving beam corresponding to the transmission resource.

16. The apparatus according to claim 12, wherein the interference amount comprises a signal to interference and noise ratio (SINR) information.

17. The apparatus according to claim 12, wherein the apparatus is a network device, or a chip.

18. A non-transitory computer-readable storage medium storing one or more instructions executable by at least one processor to perform operations comprising:
receiving, from a network device, interference information indicating using a receiving beam for receiving a downlink signal that does not cause interference to a terminal device and a downlink signal that causes interference to the terminal device;
receiving, from the network device, one or more downlink signals that do not cause interference and one or more downlink signals that cause interference through corresponding receiving beams respectively indicated by the interference information; and
transmitting, to the network device, information related to a beam selected from a plurality of beams based on the interference information and a measurement result obtained from measuring the one or more downlink signals that do not cause interference and the one or more downlink signal that cause interference, wherein the information related to the beam selected from the plurality of beams comprises a resource index of a downlink signal sent through the beam and an interference amount corresponding to the resource index, and wherein the interference amount is obtained from measuring the downlink signal that causes interference.

19. The non-transitory computer-readable storage medium according to claim 18, wherein the interference information further indicates a transmission resource for an interfering beam that transmits the downlink signal that causes interference to the terminal device.

20. The non-transitory computer-readable storage medium according to claim 18, wherein the interference information further indicates at least one of a transmission resource for the downlink signal that causes interference or a receiving beam corresponding to the transmission resource.

21. The non-transitory computer-readable storage medium according to claim 19, wherein the interference information further indicates at least one of a transmission resource for the interfering beam or a receiving beam corresponding to the transmission resource.

22. The non-transitory computer-readable storage medium according to claim 18, wherein the interference amount comprises a signal to interference and noise ratio (SINR) information.

23. A beam training method comprising:
transmitting, to a terminal device, interference information indicating using a receiving beam for receiving a downlink signal that does not cause interference and a downlink signal that causes interference;
transmitting, to the terminal device, one or more downlink signals that do not cause interference and one or more downlink signals that cause interference through transmitting beams corresponding to the receiving beams respectively indicated by the interference information; and receiving information related to a beam selected from a plurality of beams based on the interference information and a measurement result obtained from measuring the one or more downlink signals that do not cause interference and the one or more downlink signals that cause interference, wherein the information related to the beam selected from the plurality of beams comprises a resource index of a downlink signal sent through the beam and an interference amount corresponding to the resource index, and wherein the interference amount is obtained from measuring the downlink signal that causes interference.

24. The method according to claim 23, wherein the interference amount comprises a signal to interference and noise ratio (SINR) information.

25. A non-transitory computer-readable storage medium storing one or more instructions executable by at least one processor to perform operations comprising:

transmitting, to a terminal device, interference information indicating using a receiving beam for receiving a downlink signal that does not cause interference and a downlink signal that causes interference;

transmitting, to the terminal device, one or more downlink signals that do not cause interference and one or more downlink signals that cause interference through transmitting beams corresponding to the receiving beams respectively indicated by the interference information; and receiving information related to a beam selected from a plurality of beams based on the interference information and a measurement result obtained from measuring the one or more downlink signals that do not cause interference and the one or more downlink signals that cause interference, wherein the information related to the beam selected from the plurality of beams comprises a resource index of a downlink signal sent through the beam and an interference amount corresponding to the resource index, and wherein the interference amount is obtained from measuring the downlink signal that causes interference.

26. The non-transitory computer-readable storage medium according to claim 25, wherein the interference amount comprises a signal to interference and noise ratio (SINR) information.

* * * * *